(12) United States Patent
Suzuki

(10) Patent No.: US 12,346,260 B2
(45) Date of Patent: Jul. 1, 2025

(54) MEMORY DEVICE AND MEMORY SYSTEM

(71) Applicant: Kioxia Corporation, Tokyo (JP)

(72) Inventor: Tomoya Suzuki, San Diego, CA (US)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/449,935

(22) Filed: Aug. 15, 2023

(65) Prior Publication Data

US 2024/0061785 A1     Feb. 22, 2024

(30) Foreign Application Priority Data

Aug. 22, 2022   (JP) ................ 2022-131698

(51) Int. Cl.
    *G06F 12/00*     (2006.01)
    *G06F 12/0882*     (2016.01)
    *G06F 12/126*     (2016.01)

(52) U.S. Cl.
    CPC ........ *G06F 12/0882* (2013.01); *G06F 12/126* (2013.01)

(58) Field of Classification Search
    CPC ............ G06F 12/0238; G06F 12/0882; G06F 12/0866; G06F 12/126; G06F 2212/602; G06F 2212/6022; G06F 2212/6024; G06F 2212/6026; G06F 2212/6028
    See application file for complete search history.

(56) References Cited

U.S. PATENT DOCUMENTS

| | | |
|---|---|---|
| 10,719,445 B1 | 7/2020 | Navon et al. |
| 10,860,498 B2 | 12/2020 | Jeong |
| 2012/0072698 A1* | 3/2012 | Unesaki ............. G06F 12/0246 |
| | | 711/E12.008 |
| 2020/0174942 A1 | 6/2020 | Jung |
| 2022/0019538 A1 | 1/2022 | Roberts |

FOREIGN PATENT DOCUMENTS

JP     2020-87421 A     6/2020

OTHER PUBLICATIONS

Schall et al. "Lukewarm Serverless Functions: Characterization and Optimization" Proceedings of the 49th Annual International Symposium on Computer Architecture, 2022, pp. 757-770 (14 pages) DOI: 10.1145/3470496.3527390.
Zhang et al. "RnR: A Software-Assisted Record-and-Replay Hardware Prefetcher" 2020 53rd Annual IEEE/ACM International Symposium on Microarchitecture (MICRO), 2020, pp. 609-621 (13 pages) DOI: 10.1109/MICRO50266.2020.00057.

\* cited by examiner

*Primary Examiner* — Shawn X Gu
(74) *Attorney, Agent, or Firm* — Oblon, McClelland, Maier & Neustadt, L.L.P.

(57) ABSTRACT

According to one embodiment, a memory device includes a controller, a nonvolatile memory, and a cache memory. The controller is configured to record a plurality of first addresses sequentially accessed to read data stored in the nonvolatile memory, acquire an address list including a second address within the first addresses and a third address within the first addresses which is estimated to be accessed after the second address is accessed, read data from the nonvolatile memory based on the third address included in the address list if the second address included in the address list is accessed, and store, in the cache memory, the data read from the nonvolatile memory.

18 Claims, 14 Drawing Sheets

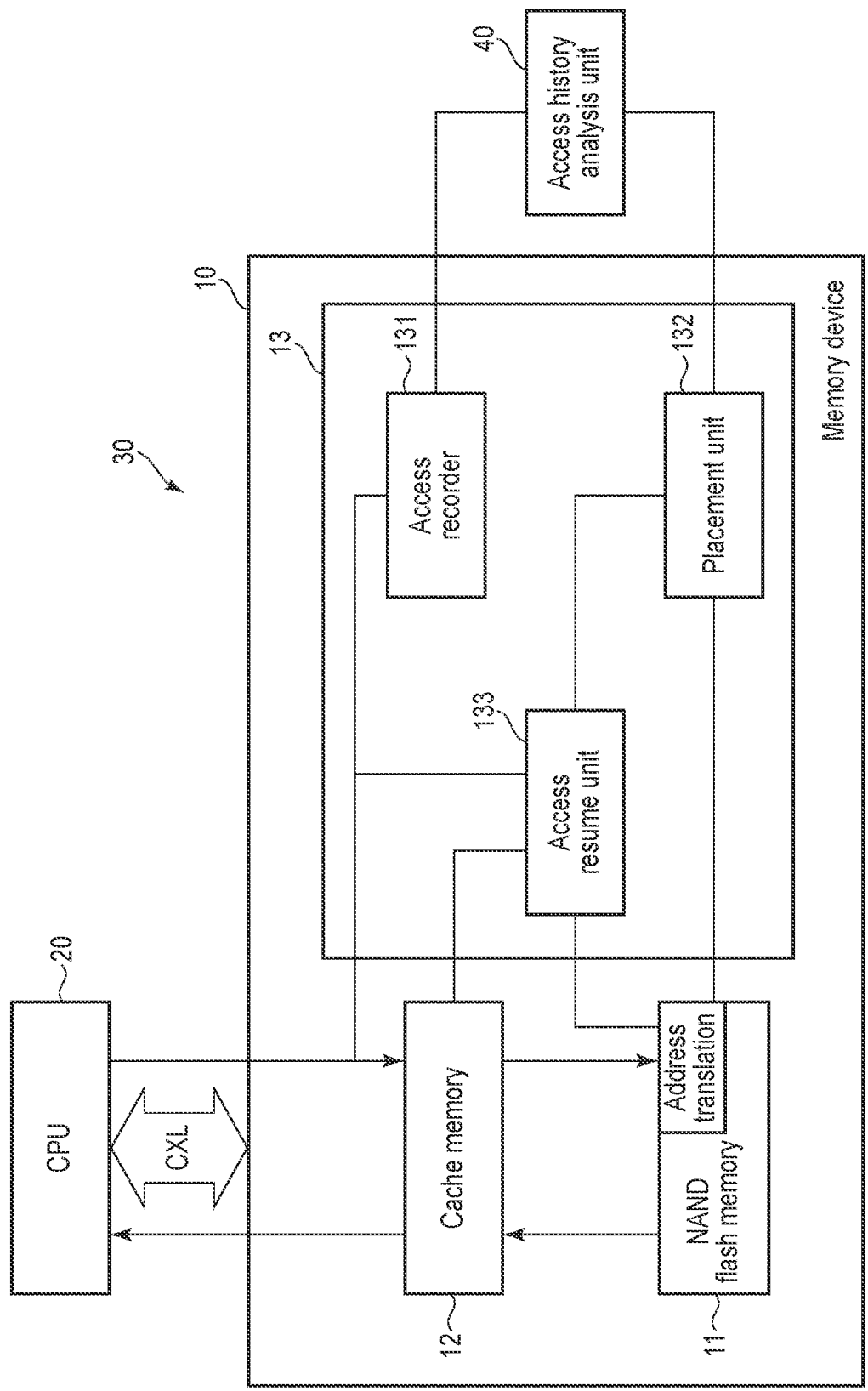
F I G. 1

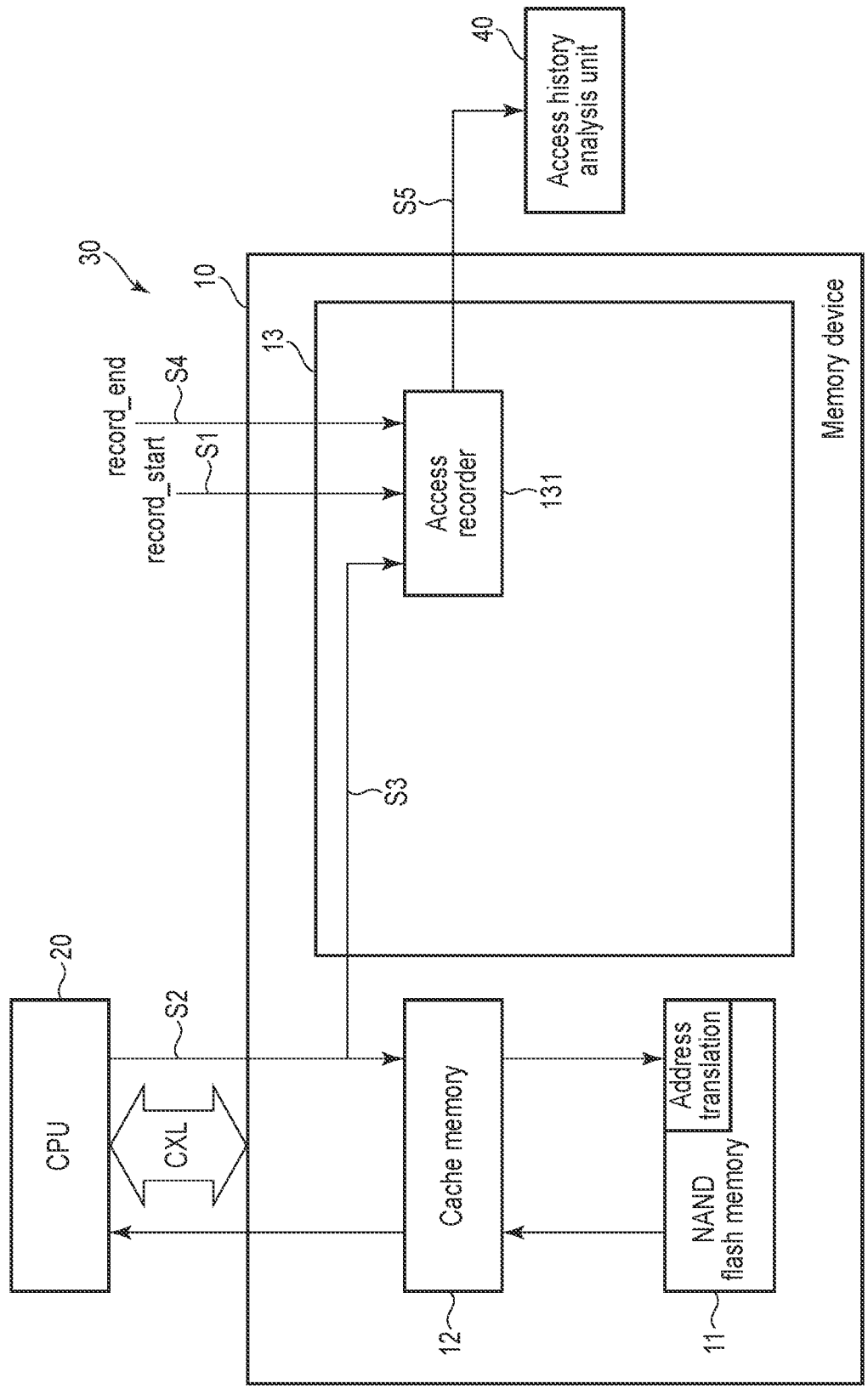
F I G. 2

| Trigger address | Resume target logical address |
|---|---|
| A0 | A8, A9, A10, A11 |
| A4 | A12, A13, A14, A15 |
| ... | ... |

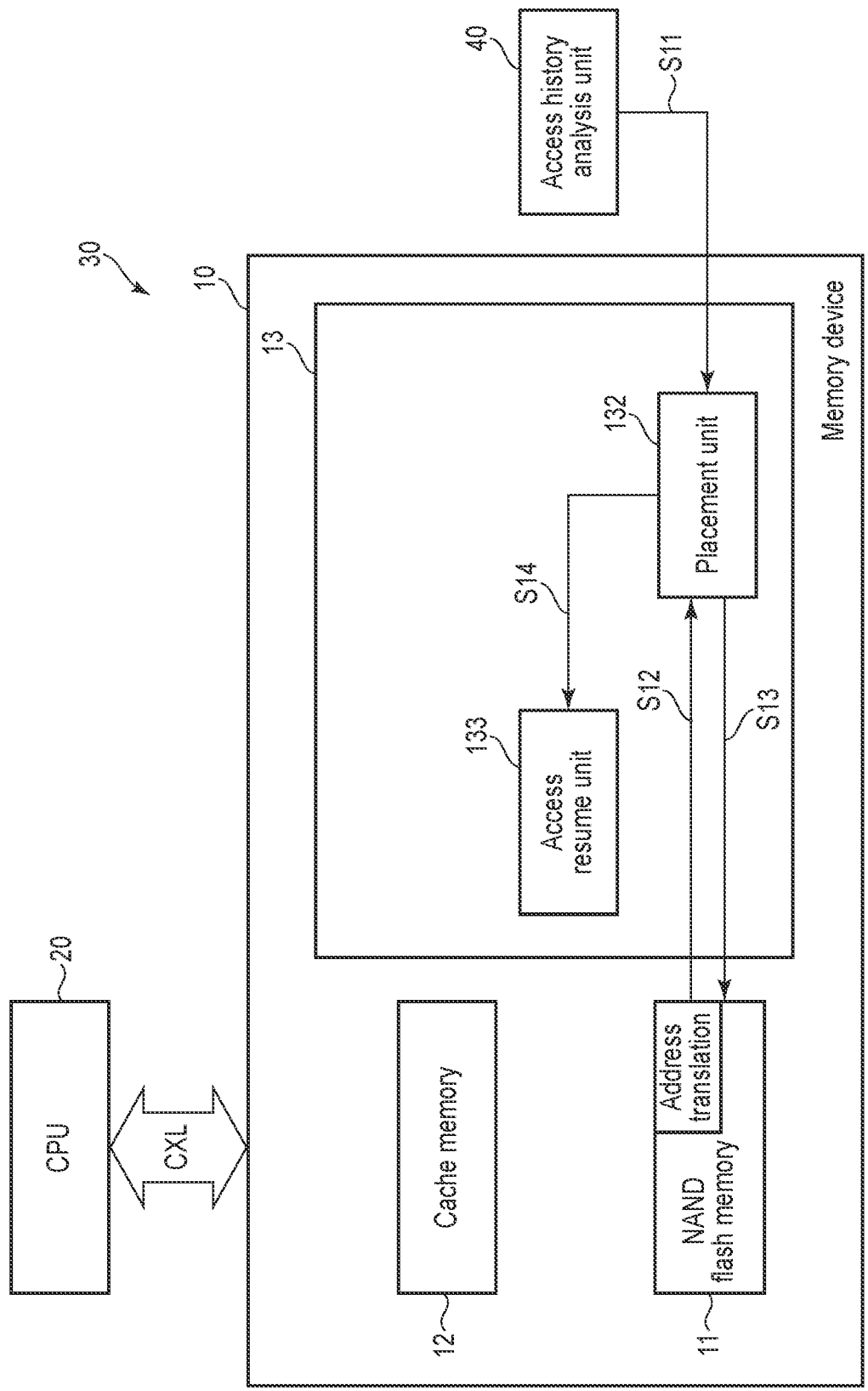
F I G. 6

| Trigger address | Resume target physical address | |
|---|---|---|
| A0 | P2 | ~132a |
| A4 | P3 | ~132b |
| ... | ... | |

F I G. 7

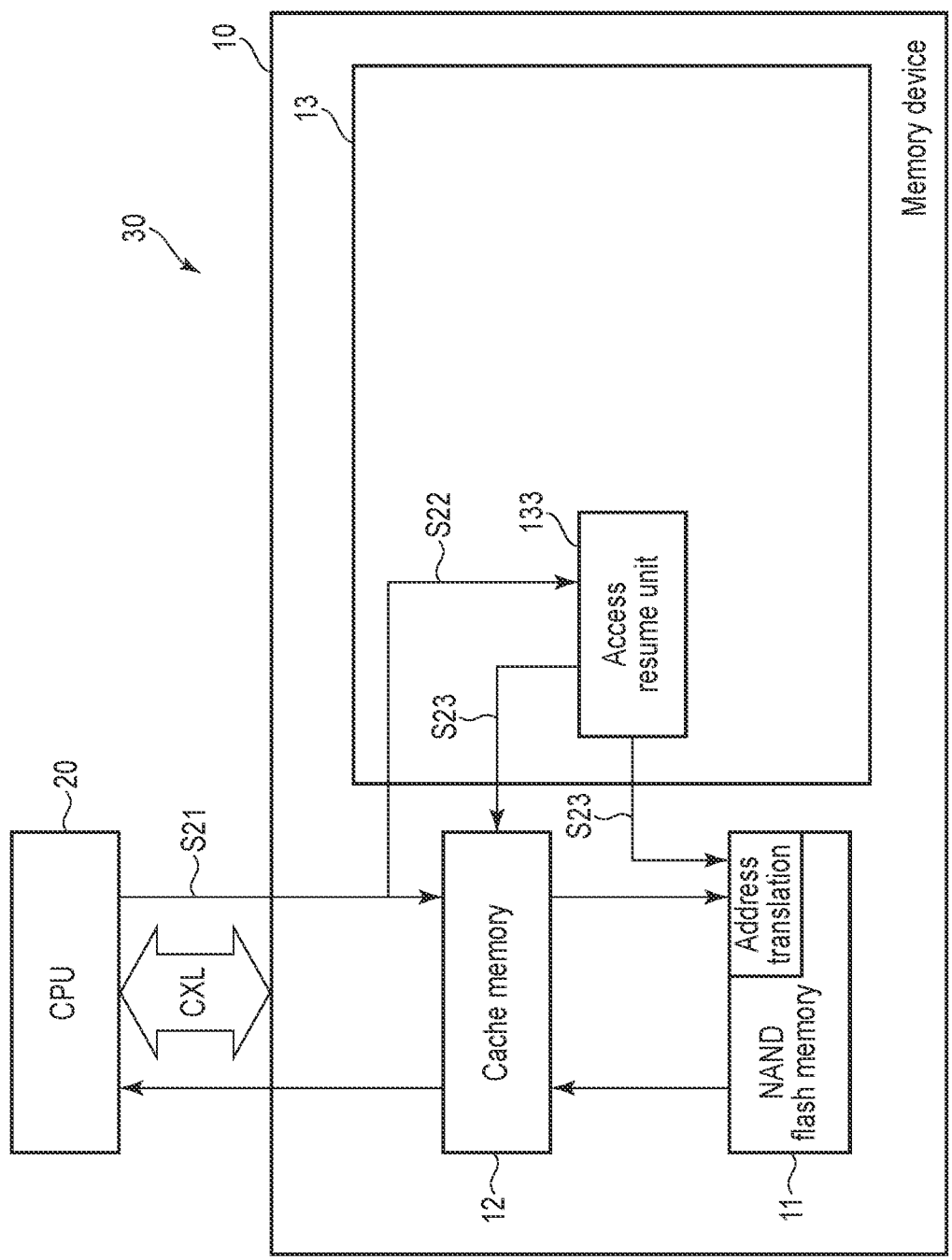
F I G. 8

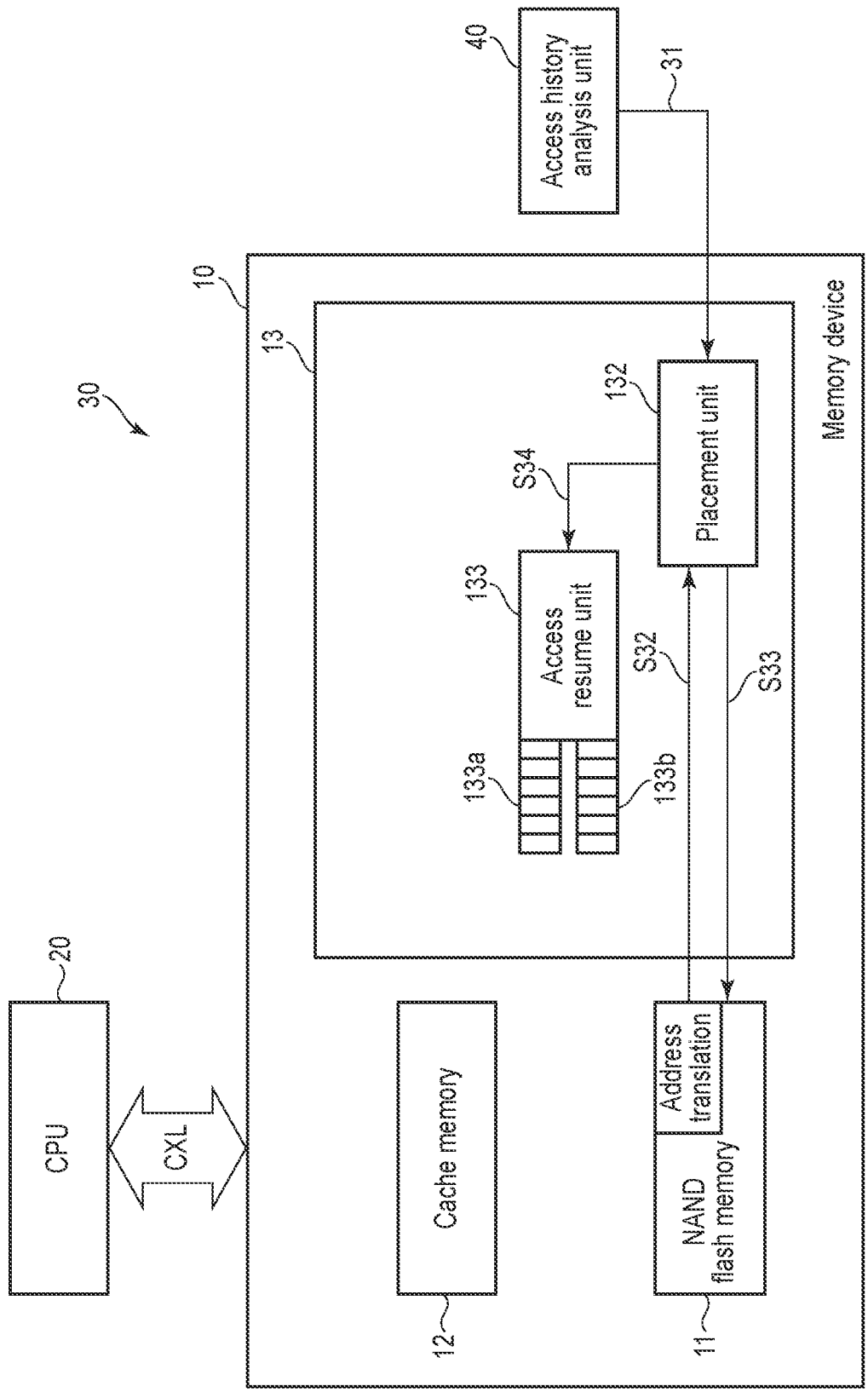
F I G. 10

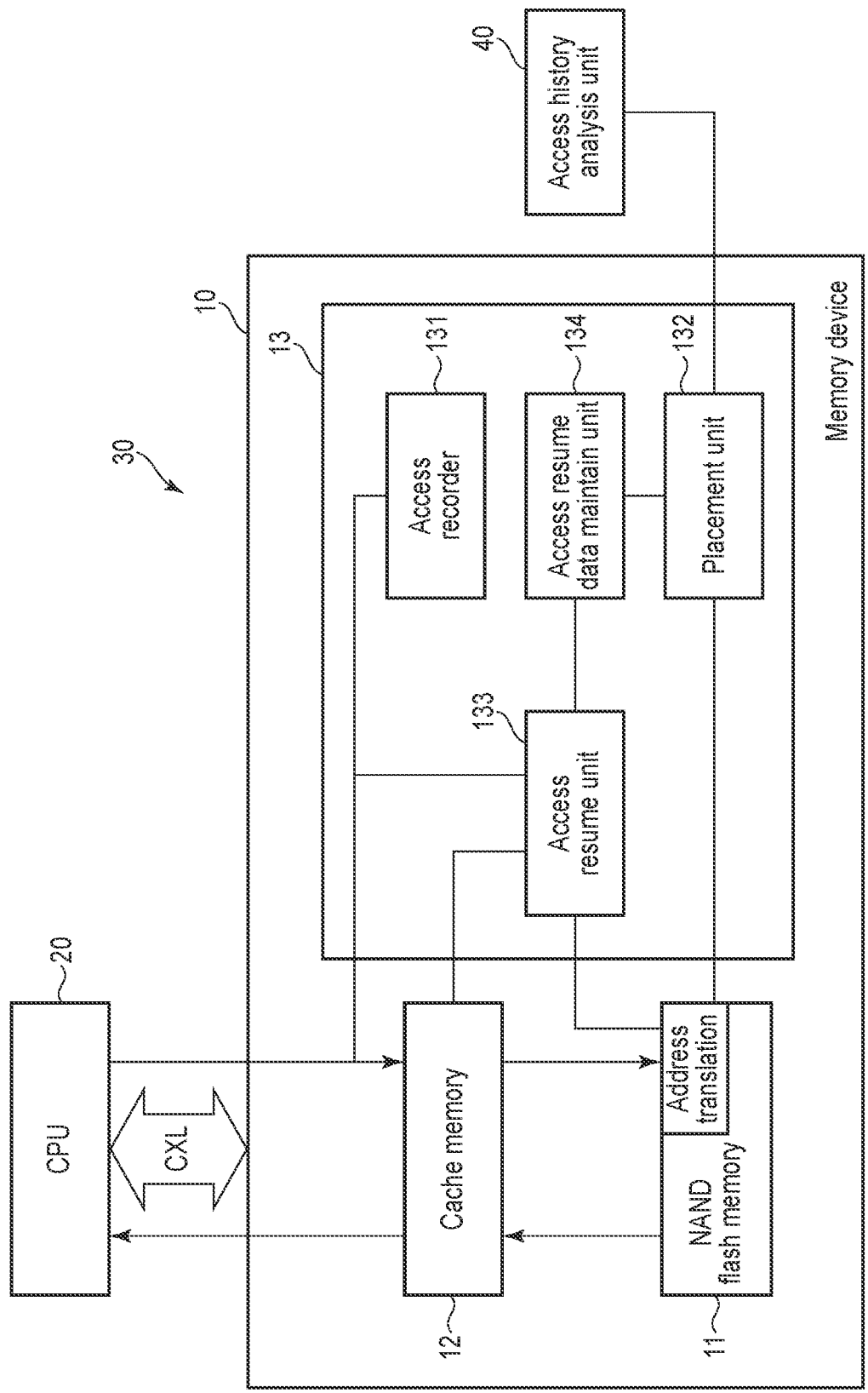
F I G. 13

| Trigger address | Resume target physical address | |
|---|---|---|
| A0 | P2 | ~132a |
| A4 | P3 | ~132b |
| A8 | P4 | ~132c |
| A12 | P5 | ~132d |
| A16 | P6 | ~132e |
| A20 | P7 | ~132f |
| ... | ... | |
F I G. 14
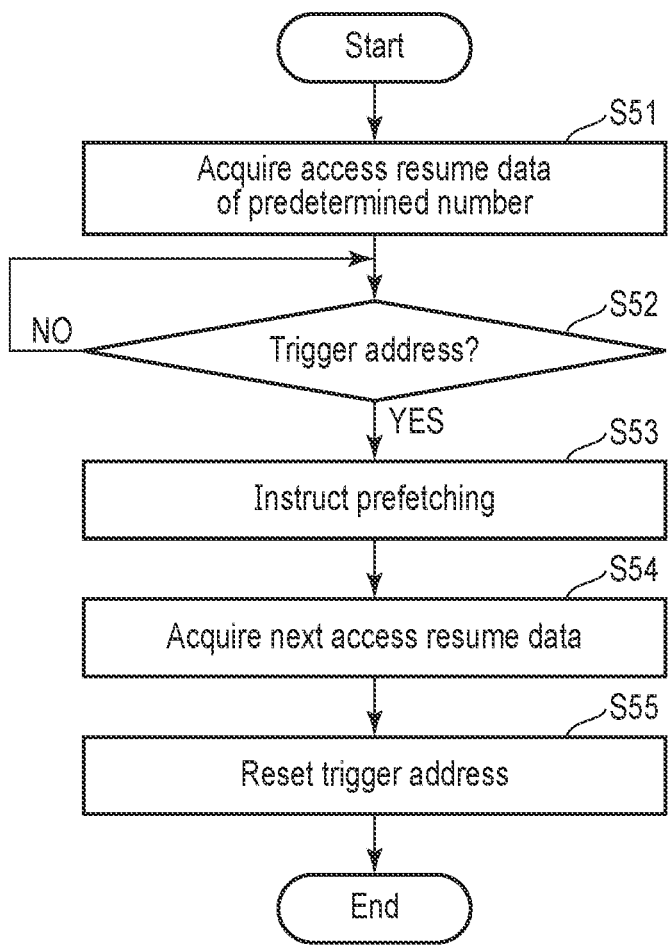
F I G. 15

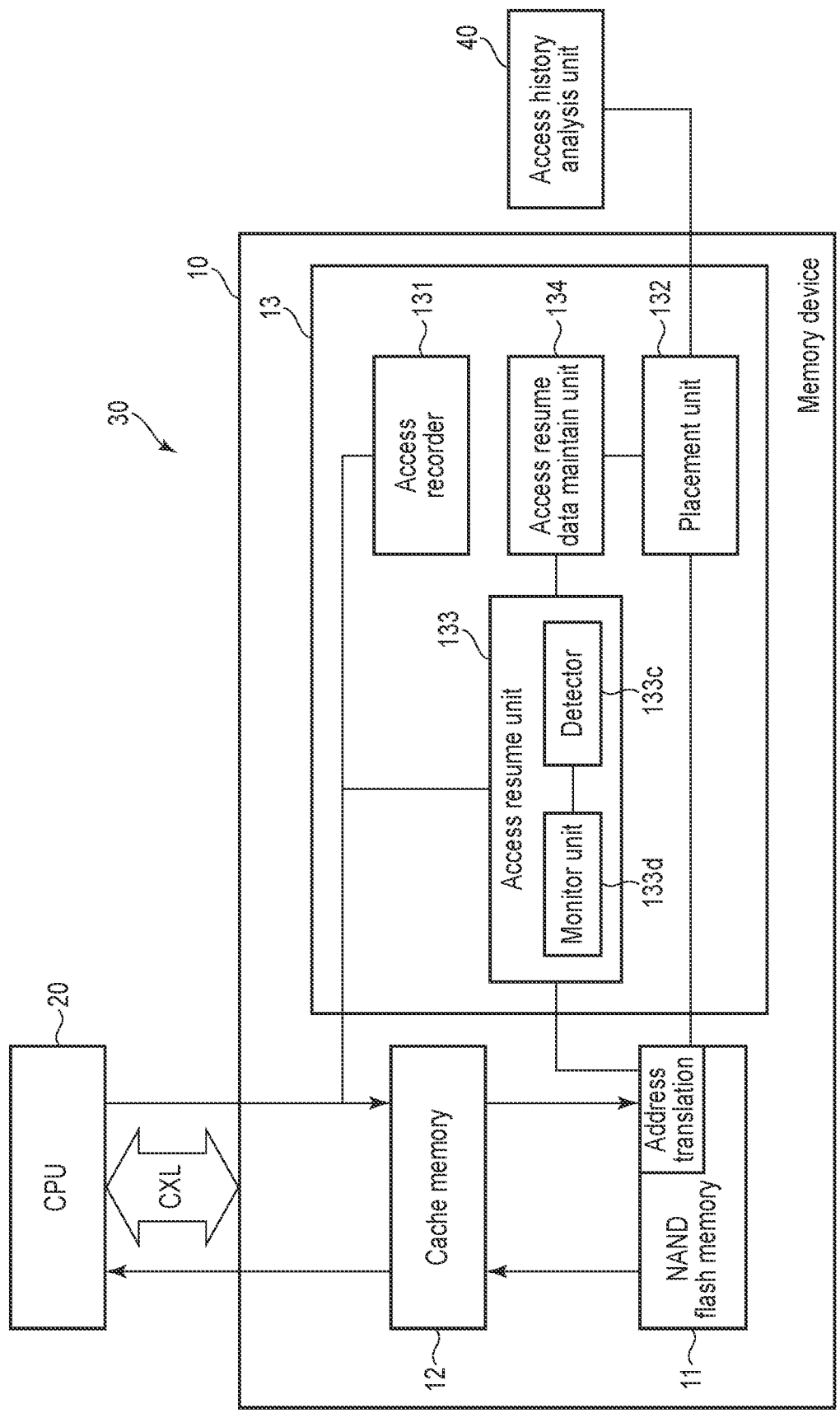
F I G. 16

MEMORY DEVICE AND MEMORY SYSTEM

CROSS-REFERENCE TO RELATED APPLICATIONS

This application is based upon and claims the benefit of priority from Japanese Patent Application No. 2022-131698, filed Aug. 22, 2022, the entire contents of which are incorporated herein by reference.

FIELD

Embodiments described herein relate generally to a memory device and a memory system.

BACKGROUND

In recent years, memory devices with a nonvolatile memory (for example, NAND flash memory) are known, and the use of such a memory device as a part of a main memory (main memory device) configured with a conventional dynamic random access memory (DRAM) and the like has been studied.

Although the aforementioned memory device costs lower than the DRAM in the production, the data read latency thereof is longer than that of the DRAM. Thus, improvement of the read performance of the memory device is demanded.

BRIEF DESCRIPTION OF THE DRAWINGS

FIG. 1 is a block diagram illustrating an example of the structure of a memory device of a first embodiment.

FIG. 2 illustrates an example of an access recording process of the first embodiment.

FIG. 6 illustrates an example of a data placement process of the first embodiment.

FIG. 7 illustrates an example of access resume data of the first embodiment.

FIG. 8 illustrates an example of an access resume process of the first embodiment.

FIG. 10 illustrates an example of a data placement process of the second embodiment.

FIG. 13 is a block diagram illustrating an example of the structure of a memory device of a third embodiment.

FIG. 14 illustrates an example of access resume data of the third embodiment.

FIG. 15 is a flowchart of an example of an access resume process of the third embodiment.

FIG. 16 is a block diagram illustrating an example of the structure of a memory device of a fourth embodiment.

DETAILED DESCRIPTION

Figure 3:
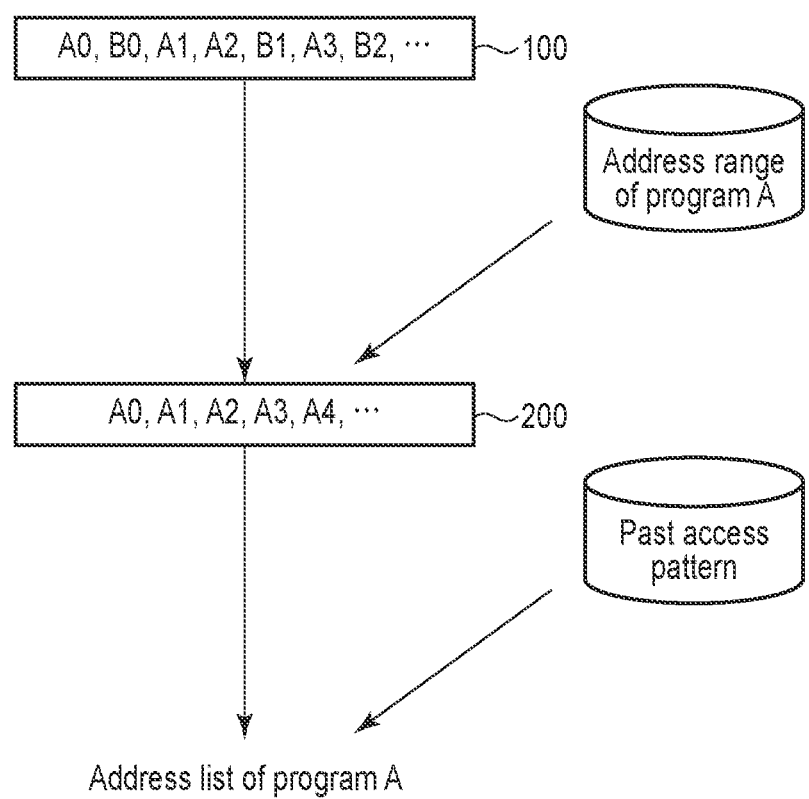
FIG. 3 illustrates an outline of an operation of an access history analysis unit of the first embodiment.

In general, according to one embodiment, a memory device includes a controller, a nonvolatile memory, and a cache memory. The controller is configured to record a plurality of first addresses sequentially accessed to read data stored in the nonvolatile memory, acquire an address list including a second address within the first addresses and a third address within the first addresses which is estimated to be accessed after the second address is accessed, read data from the nonvolatile memory based on the third address included in the address list if the second address included in the address list is accessed, and store, in the cache memory, the data read from the nonvolatile memory.

Hereinafter, embodiments will be described with reference to the drawings.

First Embodiment

First, the first embodiment will be explained. FIG. 1 is a block diagram illustrating an example of the structure of a memory device of the present embodiment.

The memory device 10 of the present embodiment is connectable to a processor of a CPU 20, for example, and the memory device 10 and the CPU 20 structure a memory system 30.

Note that, the memory system 30 of the present embodiment can be used to realize serverless computing which can execute various programs (application programs) on a server without building or maintaining the server. In the serverless computing, programs registered in advance can be executed based on event occurrence (triggers) such as clocking to a certain time (that is, at regular intervals), file uploading, or receiving messages.

Note that, in the aforementioned serverless computing, a program may be executed in a short period of time, and in that case, a start part of the program is, preferably, driven fast. The start part of the program includes a common initialization processing and the like that are performed each time the program is started.

In that case, if the state of the memory is maintained as an already started state in order to cancel an overhead in the start part, a large memory is required.

In the memory system 30, DRAM (which is not shown) is used as the main memory thereof, for example. Increasing a capacity of the DRAM costs high.

Thus, in the present embodiment, the memory device 10 of the memory system 30, used as a server to realize the aforementioned serverless computing, will be operated as a main memory connected to the CPU 20. Note that, the memory device 10 includes a nonvolatile memory and has an intermediate function between the DRAM and a storage device (for example, SSD and the like). Specifically, a memory capacity of the memory device 10 is greater than the main memory (DRAM), and an access speed with respect to the memory device 10 is faster than that of the storage device. In the present embodiment, using such a memory device 10, increasing the main memory capacity is technically achieved.

However, the data read latency of the memory device 10 is longer than that of the DRAM, and thus the performance of the program executed in the server (application performance) as mentioned above is decreased.

The present embodiment presents a memory device 10 (and a memory system 30) which can suppress such decrease in the application performance (or, can improve the read performance). Note that, since the memory device 10 of the present embodiment functions as a part of the main memory as mentioned above, it is handled as a volatile memory device while it is a nonvolatile memory device.

The memory device 10 is connected to the CPU 20 through a memory bus, for example. Note that, the memory bus connecting the memory device 10 with the CPU 20 is, for example, a Compute Express Link™ (CXL™) bus conforming to CXL™, or a bus conforming to other standards.

Here, the CPU 20 of the present embodiment is, for example, a multicore processor, and accesses to the memory device 10 through the memory bus. Specifically, the CPU 20 transmits a store command which is a write access request for data writing to the memory device 10. Furthermore, the CPU 20 transmits a load command which is a read access request for data reading to the memory device 10.

Note that, if the CPU 20 accesses the memory device 10, a physical memory address which is translated from a virtual memory address used by a program (application program). That is, in the aforementioned write access request (store command) and read access request (load command), a physical memory address translated from a virtual memory address is designated, and if the CPU 20 accesses the memory device 10, the physical memory address is transmitted from the CPU 20 to the memory device 10. In the following description, the physical memory address designated by the CPU 20 when the CPU 20 accesses to the memory device 10 (physical memory address transmitted from the CPU 20 to the memory device 10) will be referred to as physical address for convenience.

Furthermore, read/write accesses to the memory device 10 through the memory bus are executed with a predetermined data granularity. The data granularity is, for example, 64 bytes (64B), and it may be 128 bytes (128B) or 256 bytes (256B), for example. Note that, if the data granularity is, for example, 64 bytes, the CPU 20 can access data of 64 bytes by transmitting a logical address from the CPU 20 to the memory device 10.

The memory device 10 includes a NAND flash memory 11, cache memory 12, and controller 13.

The NAND flash memory 11 is a nonvolatile memory. Specifically, the NAND flash memory 11 is, for example, a three-dimensional structure flash memory. The NAND flash memory 11 includes a plurality of blocks. Each of the blocks is a unit of data erase operation. Furthermore, each of the blocks includes a plurality of physical pages. Each of the physical pages includes a plurality of memory cells connected to the same word line. Each of the physical pages is a unit of data write operation and data read operation. Note that, a size of each of the physical pages is greater than a data access unit. If the data placed in a page is read, the NAND flash memory 11 can output only partial data of the data read from one physical page (data of size of one physical page).

If the logical address is, as mentioned above, transmitted from the CPU to the memory device 10 (that is, if the logical address is accessed by the CPU 20), the logical address is translated to an address indicative of a physical location in the NAND flash memory 11 (hereinafter referred to as physical address) based on an address translation table. That is, if data is written/read to/from the NAND flash memory 11 of FIG. 1, the physical address is used. The controller to perform such address translation (controller to control the NAND flash memory 11) is included in the NAND flash memory 11 of FIG. 1. Note that, the address translation table may be stored in the NAND flash memory 11, or may be held in a DRAM (not shown).

The cache memory 12 is a volatile memory which functions as a cache memory with respect to the NAND flash memory 11, and caches data read from the NAND flash memory 11. The cache memory 12 is realized by a DRAM or a static random access memory (SRAM) of the memory device 10, for example. Furthermore, although this is not shown in FIG. 1, a controller to control the cache memory 12 is included in the cache memory 12 of FIG. 1.

Now, operations of the NAND flash memory 11 and the cache memory 12 will be briefly explained.

For example, if data is read by the CPU 20 from the memory device 10, the logical address accessed by the CPU 20 is transmitted to the memory device 10 from the CPU 20. If the data read based on the logical address transmitted from the CPU 20 as above is stored in the cache memory 12, the memory device 10 reads the read target data from the cache memory 12, and the read target data is returned to the CPU 20.

On the other hand, if the read target data is not stored in the cache memory 12, the memory device 10 reads the read target data from the NAND flash memory 11, and returns the read target data to the CPU 20.

The cache memory 12 (for example, DRAM) can read data faster than the NAND flash memory 11, and thus, if the read target data is stored in the cache memory 12, the read performance of the memory device 10 can be improved. On the other hand, if the read target data is not stored in the cache memory 12, the read performance of the memory device 10 cannot be improved.

Here, if the read target data is read from the NAND flash memory 11 as mentioned above, for example, the read target data is stored in the cache memory 12. Thus, if the logical address to read the read target data is again transmitted from the CPU 20 while the read target data is stored in the cache memory 12, the read target data can be rapidly read from the cache memory 12.

However, the capacity of the cache memory 12 is limited, and data stored in the cache memory 12 may be erased from the cache memory 12 as time lapses. If the memory system 30 of the present embodiment is used as a server to realize serverless computing, it is considered that the same program is repeatedly executed in the server. However, the program is executed in accordance with, for example, an event occurrence, and thus a time when the program is executed is unknown. Thus, even if data is stored in the cache memory 12 when a program is executed once, the data may possibly be already erased from the cache memory 12 at a time when the program is again executed.

Thus, in the present embodiment, based on a likelihood that, when the same program is executed repeatedly, the same data as in the last execution is read (is accessed) in the most cases, the controller 13 prefetches data based on an access pattern from the CPU 20 to them memory device 10 (data read pattern). Note that, a phrase "prefetch data" in the present embodiment means that data stored in the NAND flash memory 11 is read in advance and the data read is stored in the cache memory 12.

The controller 13 includes an access recorder 131, a placement unit 132, and an access resume unit 133.

The access recorder 131 records accesses of the CPU 20 with respect to the memory device 10. Specifically, the access recorder 131 stores a sequence of logical address transmitted from the CPU 20 to the memory device 10 (that is, a plurality of logical addresses sequentially accessed by the CPU 20 to read data stored in the NAND flash memory 11) (hereinafter, referred to as address sequence). Note that, the address sequence recorded by the access recorder 131 (record sequence) is transmitted to an access history analysis unit 40 located outside of the memory device 10, for example.

The access history analysis unit 40 analyzes the address sequence transmitted from the access recorder 131 (history of logical address sequentially accessed by the CPU 20). Accordingly, the access history analysis unit 40 specifies a logical address to be a trigger of the aforementioned prefetch (hereinafter, referred to as trigger address) and a logical address estimated to be accessed after the trigger address is accessed (that is, accessed at a time close to the access to the trigger address) (hereinafter, referred to as resume target logical address), based on the address sequence. A list including the trigger address and the resume target logical address specified by the access history analysis unit 40 (hereinafter, referred to as address list) is transmitted to the placement unit 132.

Note that, the access history analysis unit 40 is supposed to be realized by the CPU 20, for example. However, the access history analysis unit 40 may be realized by a processor other than the CPU 20 (or a controller), for example.

The placement unit 132 reads data from the NAND flash memory 11 (hereinafter, referred to as resume target data) based on the resume target logical address included in the address list transmitted from the access history analysis unit 40, and places (writes) the resume target data in a same page of a plurality of pages included in the NAND flash memory 11 (hereinafter, referred to as resume target page).

The placement unit 132 outputs access resume data including a trigger address included in the address list output from the access history analysis unit 40 and a physical address with a page number to identify a resume target page (page number allocated to the page) (hereinafter, referred to as resume target physical address) to the access resume unit 133.

The access resume unit 133 refers to the access resume data output from the placement unit 132 in order to monitor the logical address transmitted from the CPU 20 to the memory device 10 (logical address accessed by the CPU 20 to read data stored in the NAND flash memory 11). The access resume unit 133 instructs the NAND flash memory 11 to perform the prefetch if the trigger address included in the access resume data is accessed by the CPU 20. In that case, the resume target data placed in the resume target page based on the resume target physical address (the page number therein) included in the access resume data is read from the NAND flash memory 11, and the resume target data is stored in the cache memory 12.

Hereinafter, an operation of the memory device 10 of the present embodiment will be explained. In this example, a process executed by the access recorder 131 (hereinafter, referred to as access record process), a process executed by the placement unit 132 (hereinafter, referred to as data placement process), and a process executed by the access resume unit 133 (hereinafter, referred to as access resume process) will be mainly explained.

First, the access record process will be explained with reference to FIG. 2. Note that, in FIG. 2, the placement unit 132 and the access resume unit 133 in the controller 13 are omitted in the depiction.

As described above, the access recorder 131 of the present embodiment records a sequence of a plurality of logical addresses sequentially accessed by the CPU 20 (address sequence), and a period of time to record the address sequence (a time to start and a time to end recording of the address sequence) is instructed by the outside of the memory device 10 (for example, CPU 20), for example.

Specifically, assuming an instruction of a time to start recording of the address sequence (hereinafter, referred to as record start timing) is record_start, the record_start is transmitted to the access recorder 131 at a time when execution of a certain program is started on the memory system 30 (server in serverless computing) (step S1). The record_start transmitted in step S1 is stored in a register within the controller 13, for example. Accordingly, the access recorder 131 starts recording of the address sequence.

Next, if the CPU 20 reads data from the memory device 10 (NAND flash memory 11) while executing a program, the logical address accessed by the CPU 20 is transmitted from the CPU 20 to the memory device 10 (step S2).

In that case, the access recorder 131 acquires the logical address transmitted from the CPU 20 in step S2 (step S3). The logical address acquired in step S3 is temporarily recorded in the access recorder 131.

Note that, the record start timing is instructed by the aforementioned record_start, and a time to end recording of the address sequence (hereinafter, referred to as record end timing) will be instructed by record_end.

Given that the aforementioned record_start is transmitted to the access recorder 131 at a time when execution of a certain program is started, the record_end is transmitted to the access recorder 131 at a time when the execution of the program is terminated (step S4). The record_end transmitted in step S4 is stored in a register within the controller 13, for example. Thus, the access recorder 131 ends recording of the address sequence.

In the present embodiment, the processes of aforementioned steps S2 and S3 are repeated between the record start timing (time when the record_start is stored in the register) and the record end timing (time when the record_end is stored in the register). Accordingly, the access recorder 131 can record the aforementioned address sequence (sequence of a plurality of logical addresses).

The address sequence recorded by the access recorder 131 is transmitted from the access recorder 131 to the access history analysis unit 40 (step S5). In this example, a case where a plurality of logical addresses recorded between the aforementioned record start timing and record end timing are collectively transmitted from the access recorder 131 to the access history analysis unit 40 is considered. However, the logical address may be individually transmitted from the access recorder 131 to the access history analysis unit 40 at each transmission time from the CPU 20.

Note that, in this example, recording of the address sequence is started at the time when the record_start is stored in the register, and recording of the address sequence is ended at the time when the record_end is stored in the register (that is, there are exact instructions related to a start and an end of recording). However, recording of the address sequence may be started at, for example, a time when a specific logical address is transmitted from the CPU 20 to the memory device 10 (at a time when the specific logical address is accessed by the CPU 20), and recording of the address sequence may be ended at a time when a different specific logical address is transmitted from the CPU 20 to the memory device 10 (at a time when the specific logical address is accessed by the CPU 20). In that case, the specific logical addresses are set in the memory device 10 in advance separately. Furthermore, the time when recording of the address sequence is ended may be a time when logical addresses of a predetermined number are recorded (acquired).

Furthermore, in FIG. 2, the process executed by the access recorder 131 is mainly explained, and note that, data read based on the logical address transmitted from the CPU 20 to the memory device 10 in the access record process (read target data) is returned from the NAND flash memory 11 to the CPU 20, for example.

Note that, if the address sequence (that is, access history) is transmitted from the access recorder 131 to the access history analysis unit 40 by the execution of the aforementioned access record process, the access history analysis unit 40 analyzes the address sequence.

Hereinafter, an outline of the operation (process) of the access history analysis unit 40 will be explained with reference to FIG. 3.

First, in the present embodiment, the CPU 20 of the memory system 30 is, for example, a multicore processor, and is configured to execute a plurality of programs (application programs) in parallel.

In that case, as described above, even if the access recorder 131 records an address sequence based on record_start and record_end, the recorded address sequence may contain, for example, a logical address accessed by the CPU 20 to execute program A (which is transmitted from the CPU 20) and a logical address accessed by the CPU 20 to execute program B which is different from program A.

Thus, the access history analysis unit 40 extracts, from the address sequence transmitted from the access recorder 131, a logical address sequence accessed by the CPU 20 when executing a certain program (for example, program A) (hereinafter, referred to as access pattern).

Now, as in FIG. 3, a case where an address sequence 100 transmitted from the access recorder 131 to the access history analysis unit 40 is A0, B0, A1, A2, B1, A3, B2, . . . will be considered. Note that, A0, A1, and A2 of the address sequence 100 of FIG. 3 are logical addresses accessed by the CPU 20 to execute program A, and B0, B1, and B2 of the address sequence 100 are logical addresses accessed by the CPU 20 to execute program B. That is, the address sequence 100 is an address sequence when programs A and B are executed in parallel in the CPU 20.

In that case, the access history analysis unit 40 maintains in advance a range of a virtual memory address and a physical memory address (logical address) which may possibly be used in the execution of program A, for example (hereinafter, referred to as address range).

The access history analysis unit 40 refers to the address sequence 100 transmitted from the access recorder 131 (a plurality of logical addresses thereof) and an address range which may possibly be used in the execution of program A (logical address thereof) in order to extract an access pattern related to program A alone (that is, sequence of logical address accessed by the CPU 20 when executing program A) from the address sequence. Therefore, an access pattern 200 (A0, A1, A2, A3, A4, . . . ) is extracted from the aforementioned address sequence 100.

Note that, in this example, the access pattern 200 is extracted based on the address range which may possibly be used in the execution of program A. However, if the address range which may possibly be used in the execution of program A can be separated by a simple condition comparison or the like, the access pattern 200 may be extracted by a simpler process based on the range. Specifically, if a range of logical addresses which may possibly be used in the execution of program A and a range of logical addresses which may possibly be used in the execution of program B can be distinguished by a simple size comparison with respect to certain logical addresses (that is, if address spaces are clearly separated), an access pattern may be extracted based on the comparison result.

In this example, an access pattern is extracted from an address sequence transmitted from the access recorder 131 to the access history analysis unit 40. However, if the logical addresses which may possibly be used in the execution of a certain program can be easily determined because the aforementioned address spaces are clearly separated, for example, only the logical addresses (sequence thereof) which may possibly be used in the execution of a certain program may be recorded by performing a comparison determination process with respect to the logical addresses input in the access recorder 131 such that a record capacity of the access recorder 131 and a process load of the access history analysis unit 40 can be reduced.

The access history analysis unit 40 prepares an address list based on the aforementioned access pattern 200 (address list of program A). Note that the address list may be prepared based on the access pattern 200 alone, or may be prepared with further consideration of past access patterns managed in the access history analysis unit 40 (that is, based on a plurality of access patterns extracted from address sequences recorded for multiple times).

Hereinafter, an address list prepared by the access history analysis unit 40 will be explained with reference to FIGS. 4 and 5.

Figures 4, 5:
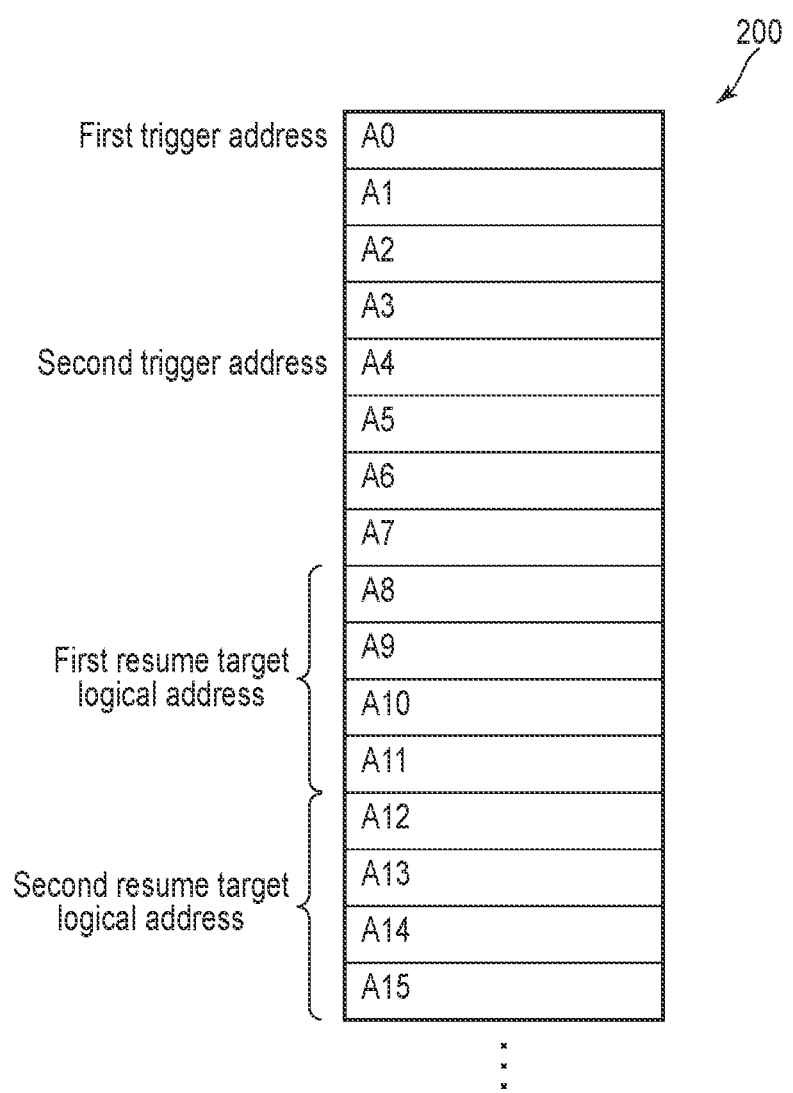
FIG. 4 illustrates an example of an access pattern of the first embodiment.
FIG. 5 illustrates an example of an address list prepared from an access pattern of the first embodiment.

FIG. 4 illustrates an example of the access pattern 200 (sequence of logical addresses accessed by the CPU 20 when executing program A). The example of FIG. 4 indicates logical addresses A0 to A15 are sequentially accessed in the CPU 20 when executing program A.

Here, as mentioned above, the address list prepared by the access history analysis unit 40 includes a trigger address and a resume target logical address which are associated with each other.

In the access pattern 200 of FIG. 4, the access history analysis unit 40 determines, for example, logical address A0 located in the head of the sequence of a plurality of logical addresses of the access pattern 200 as a first trigger address. Furthermore, the access history analysis unit 40 determines, for example, logical addresses A8 to A11 of the logical addresses of the access pattern 200 as a first resume target logical address corresponding to trigger address A0.

In this example, logical address A0 located in the head of the access pattern 200 is determined as the first trigger address, and logical addresses A8 to A11 in which logical addresses of a number predetermined between the access pattern 200 and the trigger address A0 (seven in this example) are determined as the first resume target logical address. However, the first trigger address and the first resume target logical address may be determined in accordance with a rule predetermined in the access history analysis unit 40.

However, as described later, the data read based on the first resume target logical address (resume target data) will be stored in the cache memory 12 if the trigger address is accessed by the CPU 20. Thus, given that the logical addresses are sequentially accessed as with the access pattern 200 when program A is executed, if the number of logical addresses located between a first trigger address and a first resume target logical address corresponding to the first trigger address is low, the first resume target logical address may be accessed by the CPU 20 before resume target data is stored in the cache memory 12. On the other hand, if the number of logical addresses located between the first trigger address and the first resume target logical address corresponding to the first trigger address is high, the resume target data may already be erased from the cache memory 12 when the first resume target logical address is accessed after the first trigger address is accessed in the CPU 20. That is, in the present embodiment, there may be a case where the cache memory 12 is not effectively utilized depending on a time when the first resume target logical address is accessed after the first trigger address is accessed. Thus, in the present embodiment, the first trigger address and the first resume target logical address are determined such that the cache memory 12 can be properly utilized.

Furthermore, in this example, only one trigger address A0 (and resume target logical addresses A8 to A11 with respect to the trigger address A0) is explained. However, multiple trigger addresses determined from the access pattern 200 may be adopted. Specifically, the access history analysis unit 40 further determines logical address A4 of the logical addresses of the access pattern 200 as a second trigger address, and may further determine logical addresses A12 to A15 as a second resume target logical address corresponding to the trigger address A4.

Note that, FIG. 5 indicates an example of an address list prepared from the aforementioned access pattern 200. In the example of FIG. 5, the address list includes trigger address A0 and resume target logical addresses A8, A9, A10, and A11 which are associated with each other. Furthermore, the address list include trigger address A4 and resume target logical addresses A12, A13, A14, and A15 which are associated with each other.

Note that, in the present embodiment, a case where an address list includes a plurality of resume target logical addresses corresponding to one trigger address is considered. However, there may be one resume target logical address corresponding to the one trigger address.

Furthermore, a specific resume target logical address may corresponding to a plurality of trigger addresses. Specifically, resume target logical addresses A8, A9, A10, A11, A12, A13, A14, and A15 may be associated with trigger address A0, and resume target logical addresses A12, A13, A14, A15, A16, A17, A18, and A19 may be associated with trigger address A4. In that case, resume target logical addresses A12, A13, A14, and A15 are resume target logical addresses corresponding to both trigger addresses A0 and A4. When program A is execute in actuality, resume target logical addresses A8, A9, A10, A11, A12, A13, A14, and A15 are resumed when trigger address A0 is accessed, and resume target logical addresses A12, A13, A14, A15, A16, A17, A18, and A19 are resumed when trigger address A4 is accessed, and resume target logical addresses A12, A13, A14 and A15 may overlap therein. In that case, resume target logical address A8, A9, A10, A11, A12, A13, A14, and A15 are already resumed when trigger address A0 is accessed, and thus, only resume target logical addresses A16, A17, A18, and A19 are resumed when trigger address A4 is accessed, and overlapping resume target logical addresses A12, A13, A14, and A15 may be left unprocessed.

In this example, the access pattern 200 is extracted from the aforementioned address sequence 100, and an address list (address list of program A) is prepared from the access pattern 200. However, a sequence of logical addresses accessed by the CPU 20 may be extracted as an access pattern when program B is executed from the address sequence, and an address list (address list of program B) may be prepared from the access pattern.

As mentioned above, the address list prepared by the access history analysis unit 40 is transmitted to the placement unit 132 of the controller 13.

Now, a data placement process will be explained with reference to FIG. 6. Note that, in FIG. 6, the access recorder 131 of the controller 13 is omitted from the depiction.

First, the placement unit 132 acquires an address list transmitted from the access history analysis unit 40 as mentioned above (step S11).

Next, the placement unit 132 acquires a plurality of resume target logical addresses included in the address list acquired in step S11 from the address list.

Here, as mentioned above, the resume target logical address corresponds to the logical address estimated to be accessed after the trigger address included in the address list associated with the resume target logical address (that is, logical address to be accessed at a time close to the access to the trigger address) is accessed, and resume target data read based on the resume target logical address is target data for prefetch in a case where the trigger address is accessed by the CPU 20 as described later.

However, the resume target data read based on each of the resume target logical addresses is, in many instances, scattered and stored (written) in a plurality of pages (physical pages) included in the NAND flash memory 11, for example, and reading such resume target data from each of the pages when performing prefetch may cause degradation of performance of the memory device 10.

Thus, the placement unit 132 acquires, through a controller controlling the NAND flash memory 11, for example, resume target data from the NAND flash memory 11 based on each of the resume target logical addresses acquired from the address list (step S12).

Note that, in step S12, the controller controlling the NAND flash memory 11 translates each of the resume target logical addresses into a physical address referring to the aforementioned address translation table, in order to read the resume target data from the NAND flash memory 11 based on the physical addresses.

When executing the process of step S12, the placement unit 132 places, through the controller controlling the NAND flash memory 11, the resume target data acquired in step S12 in a same page (resume target page) included in the NAND flash memory 11 (step S13). The process of step S13 corresponds to, for example, a process of packing the resume target data placed in a plurality of pages in a scattering manner into one page.

Note that, when the process of step S13 is executed, the address translation table is updated such that a corresponding relationship between the aforementioned resume target logical address and the address indicative of a physical position (physical address) in the NAND flash memory in which the resume target data is placed (stored) can be stored (managed). The process to update the address translation table is executed by a management unit managing the address translation table, for example. However, if the placement unit 132 is configured to access to the address translation table, the placement unit 132 may update the address translation table.

Next, the placement unit 132 generates access resume data including the trigger address included in the address list and the resume target physical address including a page number to identify a resume target page in which the resume target data is placed, which are associated with each other. Note that, in the present embodiment, the resume target physical address include at least the page number for the sake of convenience. However, the resume target physical address may contain, in addition to the page number, a block number, and information indicative of a position in a page identified by the page number (in-page offset), for example.

The access resume data generated by the placement unit 132 is output to the access resume unit 133 (step S14).

Note that, the aforementioned processes of steps S12 to S14 are executed per trigger address included in the address list acquired in step S11 (and a pair of resume target logical addresses), for example. That is, if the address list of FIG. 5 is acquired in step S11, for example, the access resume data of FIG. 7 is output from the placement unit 132 to the access resume unit 133.

FIG. 7 illustrates multiple access resume data including access resume data 132a and 132b. Specifically, access resume data 132a includes trigger address A0 and resume target physical address P2 which are associated with each other. Access resume data 132a indicates that resume target data read from the NAND flash memory 11 based on resume target logical addresses A8 to A11 included in the address list to be associated with the trigger address A0 are placed in the resume target page identified by the page number included in the resume target physical address P2.

Furthermore, access resume data 132b includes trigger A4 and resume target physical address P3 which are associated with each other. Access resume data 132b indicates that resume target data read from the NAND flash memory 11 based on resume target logical addresses A12 to A15 included in the address list to be associated with the trigger address A4 are placed in the resume target page identified by the page number included in the resume target physical address P3.

Note that, in this example, the access resume data includes one page number alone. However, if resume target data are placed over multiple pages, there may be two or more page numbers included in the resume target physical address. In that case, the resume target physical address may be a set of multiple page numbers, or a pair of first page number and total number of pages.

Furthermore, if the resume target data is placed in the head of the resume target page, the resume target data can be read only by the page number included in the resume target physical address, and if the resume target data is placed in the other position than the head of the resume target page, the resume target data can be read based on the page number included in the resume target physical address and in-page offset. Furthermore, the resume target data may be read using length information indicative of a length of the resume target data. In that case, resume target data defined by a length information can be read from a position of in-page offset of a specific page number. Note that, the length information may be stored in the NAND flash memory 11 side. In that case, if the trigger address is accessed, data can be read from a position of in-page offset of a specific page number, and resume target data defined by the length information from the read data can be read for processing.

Now, the access resume process will be explained with reference to FIG. 8. Note that, in FIG. 8, the access recorder 131 and the placement unit 132 of the controller 13, and the access history analysis unit 40 are omitted from the depiction.

First, when the CPU 20 reads data from the memory device 10 (NAND flash memory 11), the logical address accessed by the CPU 20 is transmitted from the CPU 20 to the memory device 10 (step S21).

In that case, the access resume page 133 refers to the access resume data in order to prefetch the resume target data (that is, to store the data in the cache memory 12), and monitors the logical address transmitted from the CPU 20 to the memory device 10 (step S22). Specifically, in step S22, a process to determine whether or not the trigger address included in the access resume data is accessed by the CPU 20 is executed based on the logical address transmitted from the CPU 20 in step S21.

If the trigger address included in the access resume data is determined to be accessed by the CPU 20, the access resume unit 133 acquires a resume target physical address included in the access resume data while being associated with the trigger address. Note that, in this example, the resume target physical address is acquired simply when the trigger address is determined to be accessed. However, a different process may be executed. Specifically, even if the trigger address is determined to be accessed, in a case where prefetch based on the resume target physical address associated with the trigger address is already performed, the resume target physical address may not be acquired.

The access resume unit 133 instructs the NAND flash memory 11 and the cache memory 12 to perform prefetch based on the acquired resume target physical address (step S23).

When the process of step S23 is executed, the controller controlling the NAND flash memory 11 reads the resume target data based on the resume target physical address instructed by the access resume unit 133 from the NAND flash memory 11, and temporarily stores the resume target data in a buffer (which is not shown). The resume target data stored in the buffer as above is read by the controller controlling the cache memory 12 to be stored in the cache memory 12.

Through the aforementioned access resume process, in response to the trigger address is accessed by the CPU 20, data to be accessed (read) based on the resume target logical address estimated to be accessed after the trigger address can be resumed (reallocated) on the cache memory 12.

In this example, prefetch is instructed when the trigger address is accessed by the CPU 20. However, for example, a time for prefetch may be notified by the CPU 20 to the memory device 10 using a side band signal and the like.

Furthermore, if a start of a specific program (for example, program A) may be notified to the memory device 10 using the side band signal. In such a case, even if multiple programs are executed in parallel in the CPU 20, for example, only the trigger address which may possibly be used in the execution of the specific program start of which is notified by the side band signal should be monitored, and a work load of the access resume unit 133 can possibly be reduced.

Note that, the data read based on the logical address (trigger address) transmitted from the CPU 2o to the memory device 10 in the access resume process is retuned to, for example, the CPU 20 from the NAND flash memory 11.

Now, the access resume process will be explained using the aforementioned access resume data of FIG. 7.

First, the access resume unit 133 monitors the logical address transmitted from the CPU 20 to the memory device 10, as mentioned above.

Here, logical address A0 is hypothetically transmitted from the CPU 20 to the memory device 10. In that case, since trigger address A0 is included in access resume data 132a of FIG. 7, and the access resume unit 133 determines that the trigger access is accessed by the CPU 20.

Next, the access resume unit 133 acquires resume target physical address P2 included in the access resume data 132a while being associated with the trigger address (logical address A0).

The access resume unit 133 instructs prefetch based on the resume target physical address P2 acquired. In that case, for example, resume target data corresponding to data read based on four logical addresses from the head of the resume target page identified by the page number included in the resume target physical address P2 (in this example, 64 bytes×4 data read based on resume target logical addresses A8 to A11) is read.

Note that, in this example, the resume target data is placed in the head of the resume target page identified by the page number included in the resume target physical address P2. However, if the resume target data is not placed in the head of the resume target page, the resume target data can be read based on the page number and in-page offset included in the resume target physical address.

As mentioned above, the resume target data read from the NAND flash memory 11 is stored in a buffer, and then, stored in the cache memory 12. Note that, the fact that the resume target data stored in the cache memory 12 is data read based on the resume target logical addresses A8 to A11 (that is, a list indicative of a corresponding relationship between the resume target data and the resume target logical address) is managed in the memory device 10 (for example, NAND flash memory 11 or the like).

For example, according to the access pattern 200 of FIG. 4, it is highly likely that logical addresses A1 to A15 are sequentially accessed by the CPU 20 after logical address A0, and thus, if logical addresses A8 to A11 are accessed by the CPU 20 after the aforementioned access resume process is executed (that is, trigger address A0 is accessed by the CPU 20), data read based on the logical addresses A8 to A11 are returned to the CPU 20 from the cache memory 12.

Note that, although detailed explanation will be omitted because a similar operation follows, if logical address A4 is transmitted from the CPU 20 to the memory device 10, resume target data corresponding to data read based on four logical addresses from the head of the resume target page identified by the page number included in resume target physical address P3 (in this example, 64 bytes×4 data read based on resume target logical addresses A12 to A15) is read, and the resume target data is stored in the cache memory 12. Accordingly, if logical addresses A12 to A15 are accessed by the CPU 20 after the trigger address A4 is accessed by the CPU 20, data read based on the logical addresses A12 to A15 are returned to the CPU 20 from the cache memory 12.

As mentioned above, in the present embodiment, the controller 13 of the memory device 10 records a plurality of logical addresses sequentially accessed in order to read data stored in the NAND flash memory 11 (nonvolatile memory) (first address), and acquires an address list including a trigger address (second address) of the recorded logical addresses, and a resume target logical address (third address) of the logical addresses estimated to be accessed after the trigger address is accessed, and if the trigger address included in the address list is accessed, resume target data is read from the NAND flash memory 11 based on the resume target logical address included in the address list, and then, the read resume target data in the cache memory 12.

That is, in the present embodiment, if the memory system 30 is used as a server in serverless computing, for example, program registered in advance is repeatedly executed (that is, the same access is repeatedly performed with respect to the memory device 10), and using that manner, data is prefetched based on the access pattern of the CPU 20 to the memory device 10 (sequence of logical address accessed by the CPU 20).

In the present embodiment, with such a structure, a state where data read based on a resume target logical address is already stored in the cache memory 12 when the resume target logical address is accessed after a trigger address (that is, a state where the data can be read from the cache memory 12 which is faster than the NAND flash memory 11) can be achieved, and thus, latency in reading data from the memory device 10 (NAND flash memory 11) can be hidden, the reading performance of the memory device 10 can be improved.

Furthermore, in the present embodiment, the NAND flash memory 11 includes plurality of pages where a page is a unit for data read operation, the address list includes a plurality of resume target logical addresses, and the controller 13 places data (resume target data) read based on each of the resume target logical addresses in the same page before the trigger address included in the address list is accessed.

Here, if the address list of FIG. 5 is acquired from the access history analysis unit 40, for example, upon access to logical address (trigger address) A0, resume target data read based on logical addresses (resume target logical addresses) A8 to A11 is read from the NAND flash memory 11, and is stored in the cache memory 12.

In that case, if resume target data read based on logical addresses A8 to A11 are stored (written) in different pages, reading of resume target data from each of the different pages is required, which is insufficient.

In contrast, in the present embodiment, resume target data read based on a plurality of resume target logical addresses as mentioned above is placed (packed) in one page, and thus, an ineffective access (data read operation) with respect to the NAND flash memory 11 in prefetching can be avoided, and reduction of necessary input/output per second (IOPS) related to the prefetching is achievable.

Note that, in the present embodiment, a case where a controller included in the NAND flash memory 11 translates a logical address to a physical address is considered. However, such address translation may be performed by a controller controlling the cache memory 12, for example.

Furthermore, in the present embodiment, a case where prefetch is performed with the logical address. However, as mentioned above, if a structure where the address translation of the controller controlling the cache memory 12 performs the address translation is adopted, management of cache data may be performed not in a logical address base but in a physical address base. In that case, in the prefetching from the NAND flash memory 11, the prefetching is possible with only the physical address without using the logical address. With such a structure, a list indicative of a corresponding relationship between resume (prefetch) target data and logical addresses is not required, which is advantageous.

In the present embodiment, a plurality of resume target data are placed in one page. However, the reading performance of the memory device 10 is improved if the resume target data can be prefetched before the resume target logical address is accessed, and thus, a structure where a process of placing a plurality of resume target data in one page is omitted can be adopted. Furthermore, even in a structure where a process of placing a plurality of resume target data in one page is omitted, such a plurality of resume target data (two or more resume target data thereof) are placed in the same page, the reading performance can further be improved by reading the resume target data from the page (that is, a plurality of resume target data in one page read operation).

Note that, if the resume target data read based on each of the resume target logical addresses as mentioned above are placed in the same page, access resume data including a trigger address and a resume target physical address (fourth address) including a page number to identify the page is prepared, and if the trigger address included in the access resume data is accessed, resume target data is read from the NAND flash memory 11 based on the resume target physical address included in the access resume data. With such a structure, a plurality of resume target data placed in the same page (resume target page) can be properly read from the NAND flash memory 11, and are stored (prefetched) in the cache memory 12.

Incidentally, according to the address list of FIG. 5, and the access resume data of FIG. 7, data read based on logical addresses after logical address A8 can be rapidly read from the cache memory 12 by prefetching. However, data read based on logical addresses A0 to A7 is not stored in the cache memory 12, and cannot be read rapidly. Thus, for example, in the data placement process or the like, an additional process to store data read based on logical addresses A0 to A7 in, for example, the cache memory 12 in advance may be executed. In such a case, even if logical addresses A0 to A7 are accessed by the CPU 20, the data read based on the logical addresses can be rapidly returned to the CPU 20 from the cache memory 12. In this example, the data read based on the logical addresses A0 to A7 is stored in the cache memory 12. However, the data should be stored in a storage area from which data can be read faster at least than the NAND flash memory 11 (for example, DRAM used in a main memory in the memory system 30 or another memory in the memory device 10). That is, in the present embodiment, a start part of an access pattern which cannot be prefetched (data read based on a logical address corresponding thereto) may be pinned in a rapid recording area.

Furthermore, in the present embodiment, an address sequence is recorded in first execution of a certain program (for example, program A), and prefetch is performed in second execution or thereafter of the certain program, and therein, all data must be read from the NAND flash memory 11 in the first execution of the certain program, and thus, the latency becomes long. Thus, data read based on logical addresses (sequence thereof) accessed in the execution of a certain program without access resume data prepared therein may be assigned to use DRAM used as a main memory or the like instead of the NAND flash memory 11. With such a structure, data can be read rapidly in the first execution of a certain program. However, even if the DRAM is used as above, the CPU 20 accesses the DRAM via the memory device 10. In other words, even if data is read from the DRAM, the operation of the CPU 20 is similar to that of a case where the memory device 10 is accessed. That is, either the NAND flash memory 11 or the DRAM is accessed using the same logical address. Only the difference therein is which of the NAND flash memory 11 and the DRAM (main memory) the physical address translated inside the memory device 10 indicates.

Note that, with the structure of prefetching the second execution of a certain program, when the first execution of the certain program ends, data stored in the cache memory 12 or the DRAM used as a main memory in the memory system 30 may be deleted. Note that, if data stored in the NAND flash memory 11 is not copied in a DRAM but only exists in the DRAM, a process of moving the data to the NAND flash memory 11 from the DRAM will be required.

Furthermore, in the present embodiment, a same program is executed repeatedly, and the access resume data prepared as above may be repeatedly used every time when the program is executed, and the access resume data may be periodically modified (updated) based on the address sequence recorded at every time when the program is executed.

Note that, modification of the access resume data may be performed when, for example, cache hit rate of prefetched data is low (that is, may be performed using a low cache hit rate as a trigger), or may be performed when a trigger address included in the access resume data is not accessed by the CPU 20 (that is, may be performed using a failed trace of trigger address as a trigger).

Furthermore, the modification of the access resume data may be performed based on a prefetching time. Specifically, for example, a time of storing (refilling) of resume target data to the cache memory 12 and a time of erasing (evicting) the data from the cache memory 12 may be recorded (dumped), and if the resume target data is erased from the cache memory before the resume target data stored in the cache memory 12 (that is, a prefetching time is premature), the access resume data is modified such that the prefetching time is delayed. On the other hand, if the resume target data is stored in the cache memory 12 after the resume target data is accessed (that is, a prefetching time is too slow), the access resume data is modified such that the prefetching time is accelerated. That is, in the present embodiment, the access resume data may be modified based on a measurement result of whether or not prefetching is properly performed (that is, whether or not resume target data stored in the cache memory 12 is properly used). Note that, a prefetching time is adjusted by, for example, a number of logical addresses between a trigger address and a resume target logical address in an access pattern.

Second Embodiment

Now, a second embodiment will be explained. Note that, in the present embodiment, same detailed explanation as with the above-described first embodiment will be omitted, and elements different from the first embodiment will be explained. Furthermore, the structure of the memory device of the present embodiment is similar to that of the first embodiment, and thus, it will be explained with reference to FIG. 1.

In the above-described first embodiment, for example, all of logical addresses A0 to A15 of the access pattern of FIG. 4 has the same priority. In the present embodiment, different priorities are assigned to the logical addresses A0 to A15, and this point is different from the first embodiment.

Here, an example of priorities assigned to logical addresses of an access pattern in the present embodiment will be explained with reference to FIG. 9.

In this example, the aforementioned address sequence is recorded for three times, and an access pattern (for example, sequence of logical addresses accessed by CPU 20 when program A is executed) is extracted from each of the three-time recorded address sequences (hereinafter, referred to as first to third address sequences). In that case, the access pattern extracted from the first address sequence is patterned with logical addresses A0, A1, A2, A3, A4, A5, and A6, the access pattern extracted from the second address sequence is patterned with logical addresses A2, A5, A6, A3, and A4, and the access pattern extracted from the third address sequence is patterned with logical addresses A2, A3, A5, A4, A6, and A7.

In the present embodiment, in such a plurality of access patterns, a higher priority is assigned to, for example, logical addresses of many occurrences (high occurrence frequency) while a lower priority is assigned to logical addresses of few occurrences (low occurrence frequency).

Figure 9:
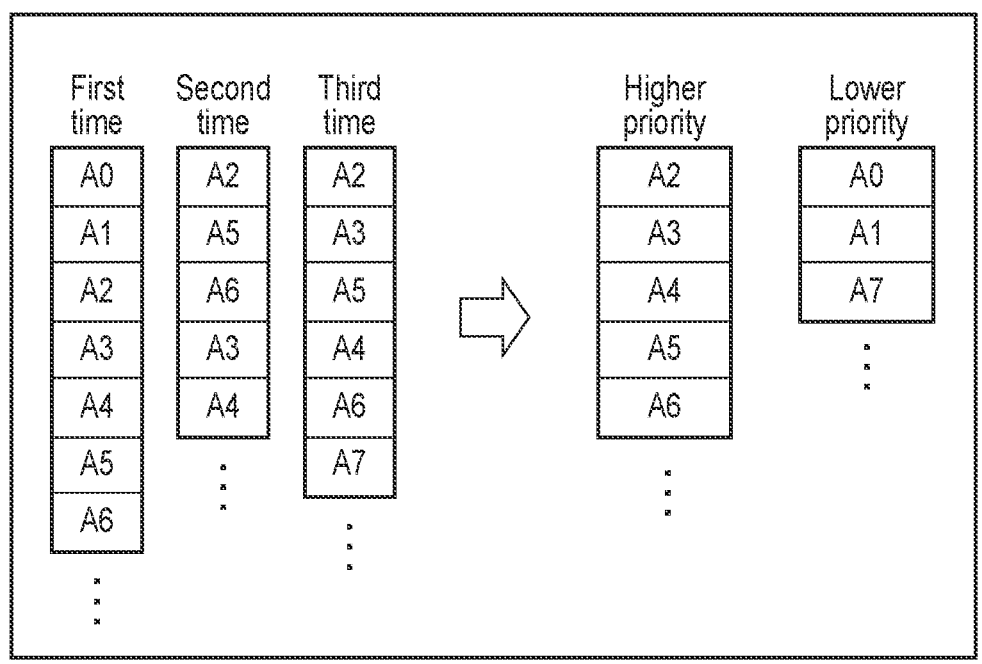
FIG. 9 illustrates an example of priority assigned to a logical address of an access pattern of a second embodiment.

In the example of FIG. 9, a high priority is assigned to the logical addresses A2, A3, A4, A5, and A6 occurring in all access patterns, and a low priority is assigned to other logical addresses A0, A1, and A7.

Note that, the priority explained here is merely an example, and the present embodiment suffices if a higher priority is assigned to logical addresses used for reading data which should definitely be prefetched, and a lower priority is assigned to logical addresses used for reading data which would be prefetched if the capacity allows.

In that case, an access history analysis unit 40 prepares an address list including a trigger address and resume target logical addresses to each of which priority is assigned, and transmits the address list to a placement unit 132.

Hereinafter, an operation of the memory device 10 of the present embodiment will be explained. Note that, since an access record process of the present embodiment is the same as with that of the above-described first embodiment, the detailed explanation thereof is omitted here. In this example, a data placement process and access resume process will be explained.

First, the data placement process will be explained with reference to FIG. 10. Note that, in FIG. 10, an access recorder 131 included in the controller 13 is omitted from depiction.

The placement unit 132 acquires an address list transmitted from the access history analysis unit 40 (step S31). Note that the aforementioned priority is assigned to each of the resume target logical addresses included in the address list acquired in step S31.

Next, the placement unit 132 acquires a plurality of resume target logical addresses included in the address list acquired in step S31 from the address list.

The placement unit 132 acquires, through a controller controlling the NAND flash memory 11, for example, data (resume target data) from the NAND flash memory 11 based on each of the resume target logical addresses acquired from the address list (step S32). Note that, the process of step S32 corresponds to the aforementioned process of step S12 of FIG. 6.

When the process of step S32 is executed, the placement unit 132 places, through the controller controlling the NAND flash memory 11, the resume target data acquired in step S32 within a same page (resume target page) included in the NAND flash memory 11 (step S33).

Note that, the process of step S33 is, as with the process of step S13 of FIG. 6, a process of packing resume target data scattered to multiple pages into one resume target page. Note that, in step S33, among a plurality of resume target logical address included in the address list while being associated with a trigger address, for example, resume target data read based on resume target logical addresses with high priority are packed into one resume target page while resume target data read based on resume target logical addresses with low priority are packed in a resume target page which is different from the aforementioned resume target page. Note that, if the resume target data read based on the resume target logical addresses with a high priority and the resume target data read based on the resume target logical addresses with a low priority are contained in a same page, they may be packed in the same page.

Next, the placement unit 132 prepares access resume data including a trigger address included in the address list and a resume target physical address with a page number used to identify a resume target page in which the resume target data is placed, which are associated with each other. The access resume data prepared as above by the placement unit 132 is output to the access resume unit 133 (step S34).

Now, the aforementioned processes of steps S33 and S34 will be explained. In this example, the aforementioned address list of FIG. 5 is acquired in step S31, a high priority is assigned to resume target logical addresses A8 and A9 of resume target logical addresses A8, A9, A10, and A11 included in the address list while being associated with trigger address A0, and a low priority is assigned to resume target logical addresses A10 and A11.

According to the above, if resume target data read from the NAND flash memory 11 based on the resume target logical addresses A8 and A9 with a high priority to one resume target page in step S33, then the access resume data including the trigger address A0 and a resume target physical address with a page number to identify the resume target page (that is, access resume data prepared from the resume target logical addresses with a high priority) are output to the access resume unit 133 in step S34.

Furthermore, if resume target data read from the NAND flash memory 11 based on the resume target logical addresses A10 and A11 with a low priority is placed in one resume target page in step S33, then access resume data including the trigger address A0 and a resume target physical address with a page number to identify the resume target page (that is, access resume data prepared from the resume target logical addresses with a low priority) are output to the access resume unit 133 in step S34.

Note that, the trigger address A0 (and resume target logical addresses A8 to A11 included in the address list while being associated with the trigger address A0) is described here. However, the same process is executed with respect to other trigger addresses including trigger address A4.

In the following description, for the convenience of explanation, access resume data prepared from the resume target logical addresses with a high priority will be referred to as first access resume data, and access resume data prepared from the resume target logical addresses with a low priority will be referred to as second access resume data.

Now, the access resume process of the present embodiment will be explained with reference to a flowchart of FIG. 11. Note that, the access resume process of the present embodiment is substantially the same as with that of the first embodiment. However, in the access resume process, if it is determined that a trigger address included in the access resume data is accessed by the CPU 20 as explained in the above-described first embodiment, the first access resume data including the trigger address is stored in a queue 133a corresponding to high priority (hereinafter, referred to as first queue), and the second access resume data including the trigger address is stored in a queue 133b corresponding to low priority (hereinafter, referred to as second queue). Note that, although this is not mentioned in the explanation of the first embodiment, the access resume unit 133 of the first embodiment may use queues to store the access resume data.

In that case, the access resume unit 133 determines whether or not the first access resume data is stored in the aforementioned first queue 133a (step S41).

If the first access resume data is stored in the first queue 133a (YES in step S41), the access resume unit 133 extracts the first resume data from the first queue 133a, and instructs prefetching using the first access resume data (step S42). The process of step S42 corresponds to the process of step S23 of FIG. 8, and thus, the detailed description thereof is omitted here.

On the other hand, if the first access resume data is not stored in the first queue 133a (NO in step S41), the access resume unit 133 refers to a second queue 133b in order to determine whether or not the second access resume data placed in the head of the second queue 133b is old (step S43).

Note that, the second access resume data stored in the aforementioned second queue 133b includes a date when the second access resume data is stored in the second queue 133b, and the aforementioned process of step S43 is determined based on a time lapse between the date applied to the second access resume data placed in the head of the second queue 133b and the current date.

If the second access resume data placed in the head of the second queue 133b is determined to be old (YES in step S43), the access resume unit 133 discards the second access resume data (step S44).

On the other hand, if the second access resume data placed in the head of the second queue 133b is determined to be not old (NO in step S43), the access resume unit 133 determines whether or not a read number with respect to the NAND flash memory 11 (outstanding request number) is below a threshold (step S45). Note that, in this example, the current read number with respect to the NAND flash memory 11 in the memory device 10 is already counted, and the access resume unit 133 can grasp the read number with respect to the NAND flash memory 11.

If the read number with respect to the NAND flash memory 11 is determined to be below the threshold (YES in step S45), the access resume unit 133 extracts the second access resume data placed in the head of the second queue 133b (access resume data including a trigger address accessed by the CPU 20), and instructs prefetching using the second access resume data (step S46). The process of step S46 corresponds to the process of step S23 of FIG. 8, and thus, the detailed explanation thereof will be omitted.

On the other hand, if the read number with respect to the NAND flash memory 11 is not below the threshold (NO in step S45), the process of FIG. 11 ends.

Figure 11:
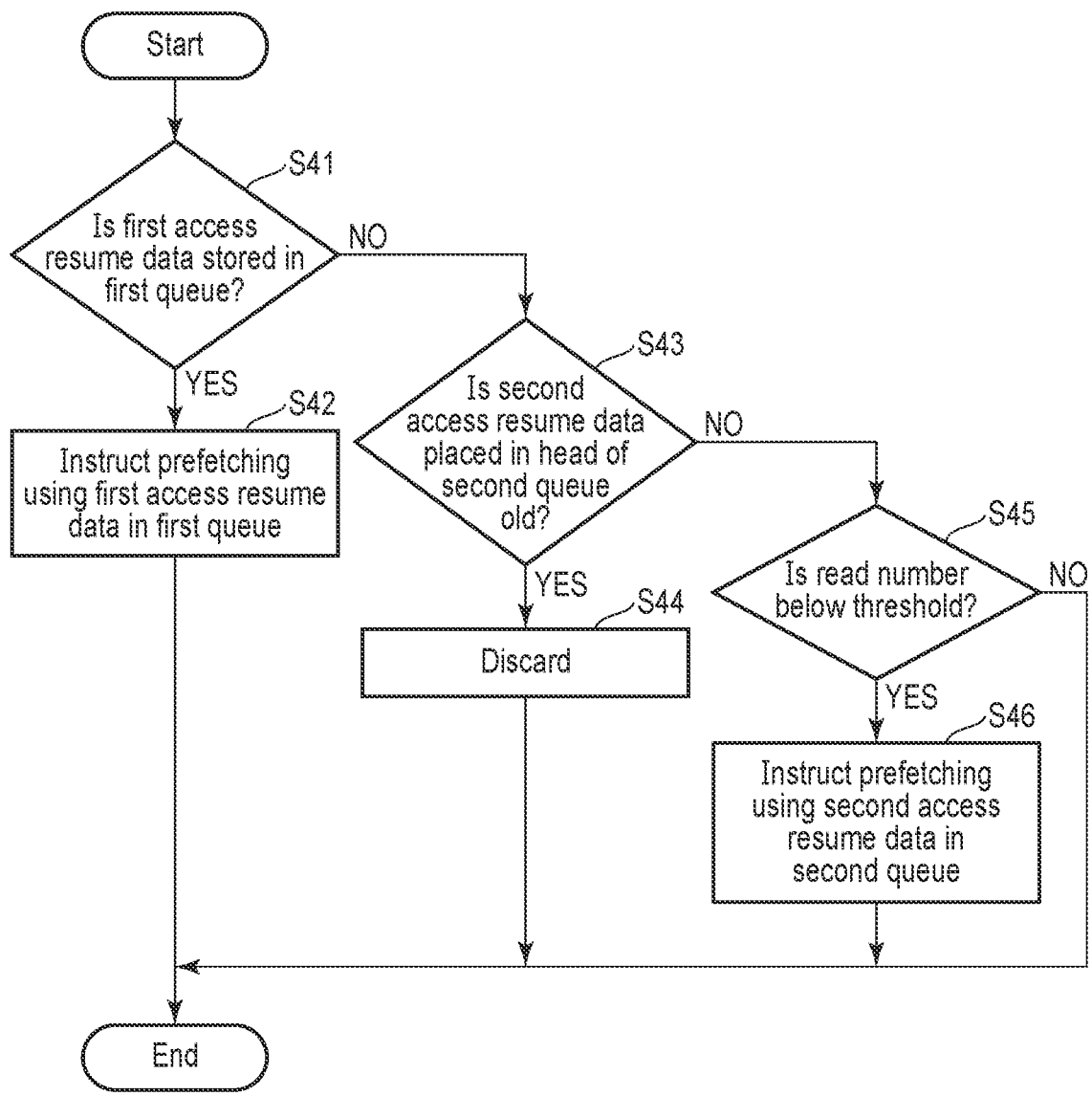
FIG. 11 is a flowchart of an example of an access resume process of the second embodiment.

Note that, the aforementioned process of FIG. 11 is repeatedly executed if the access resume data is stored in the first queue 133a and the second queue 133b.

Note that, in the example of FIG. 11, the instruction of prefetching is executed using the second access resume data if the read number with respect to the NAND flash memory 11 is below the threshold. However, a condition used for the instruction of prefetching using the second access resume data may be different from the read number with respect to the NAND flash memory 11 below the threshold. Furthermore, the present embodiment suffices if prefetch is performed referring to the first access resume data with higher priority than the second access resume data.

Furthermore, in this example, the first and second access resume data are stored in the first queue 133a and the second queue 133b. However, the first and second access resume data may be managed in other data structures.

As mentioned above, in the present embodiment, resume target data read based on the resume target logical address with a high priority (fifth address) is placed in one resume target page, first access resume data including a trigger address and a resume target physical address with a page number to identify the resume target page is prepared, resume target data read based on the resume target logical address with a low priority (sixth address) is placed in the other resume target page, and second access resume data including a trigger address and a resume target physical address with a page number to identify the resume target page is prepared. Furthermore, in the present embodiment, in order to store resume target data in the cache memory 12 (that is, to prefetch), the first access resume data is referred to with a higher priority than the second access resume data (that is, prefetch using the first access resume data is prioritized than prefetch using the second access resume data).

Now, the above-described first embodiment is considered to be structured such that all data read based on the resume target logical address with a high priority and the resume target logical address with a low priority must be prefetched, data read based on the resume target logical address with low occurrence (that is, with a low priority) is stored in the cache memory 12, and thus, a work load related to the prefetch and a data amount stored in the cache memory 12 both increase.

On the other hand, the above-described first embodiment is considered to be structured such that only the data read based on the resume target logical address with a high priority is prefetched, if the resume target logical address with low occurrence (that is, with a low priority) is accessed by the CPU 20, data must be read from the NAND flash memory 11 based on the resume target logical address, and the cache memory 12 does not contribute to hiding of the latency.

In contrast, in the present embodiment, as mentioned above, data read based on the resume target logical address with a high priority is prioritized to be prefetched, and data read based on the resume target logical address with a low priority is prefetched corresponding to a condition of the memory device 10 such as a read number with respect to the NAND flash memory 11, and in such a structure, the priority is considered to effectively improve the reading performance of the memory device 10 (to hide the latency).

Note that, in the present embodiment, the priority of the resume target logical address is determined based on the occurrence number (occurrence frequency) in the address sequence (access pattern extracted therefrom) recorded for multiple times. However, the priority may be determined based on a different standpoint.

Note that, depending on programs executed by the memory system 30, the access pattern may be changed based on, for example, a conditional branch.

Figure 12:
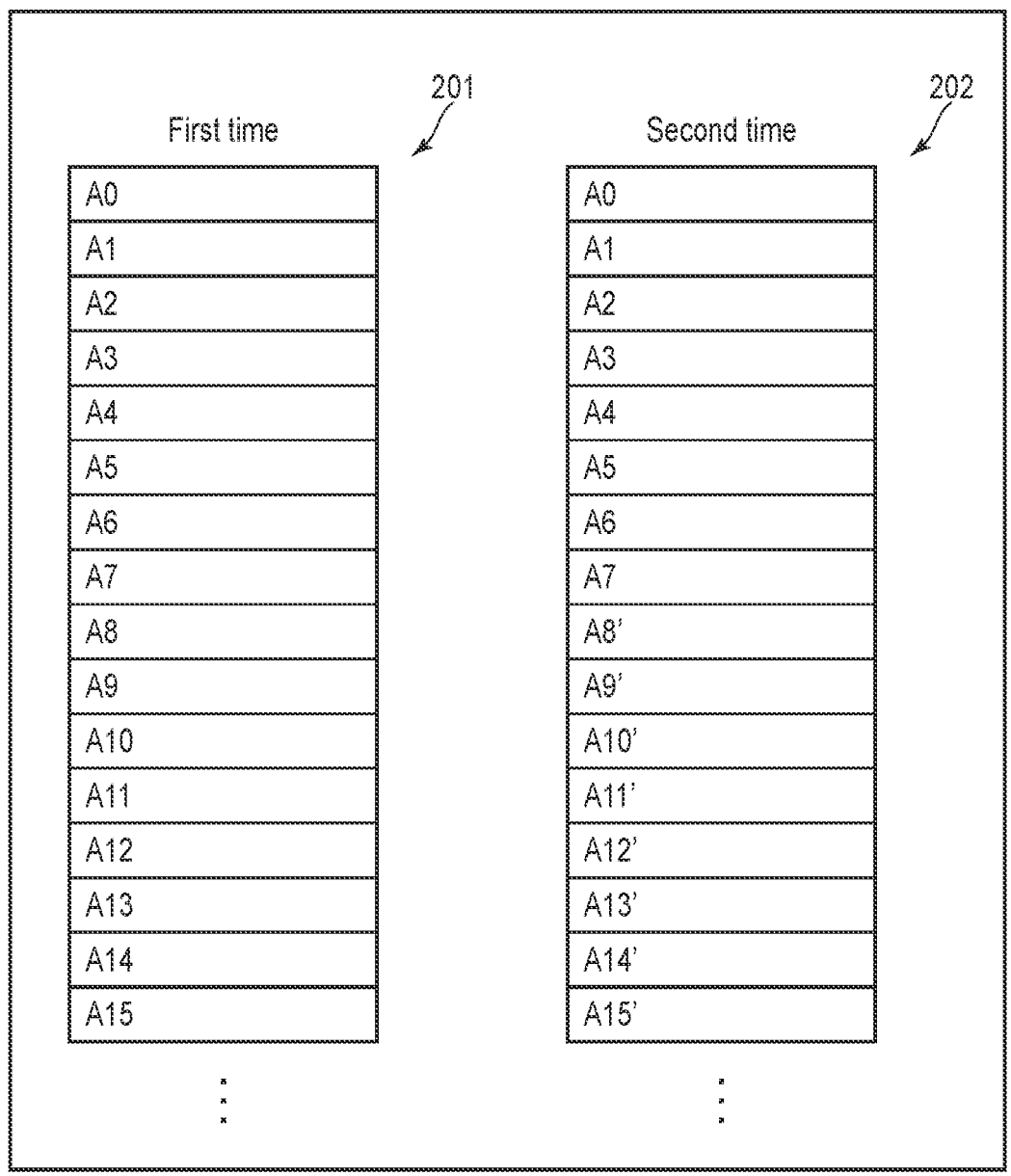
FIG. 12 illustrates an example of a change of the access pattern by a conditional branch.

Here, FIG. 12 illustrates an example where an access pattern changes based on the aforementioned conditional branch. Specifically, the example of FIG. 12 illustrates access pattern 201 extracted from an address sequence recorded in the first execution of a program and access pattern 202 extracted from an address sequence recorded in the second execution of the program. Note that, the access patterns 201 and 202 indicate that, after data is read based on logical addresses A0 to A7, for example, there are a case where data is read based on logical addresses A8 to A15 and a case where data is read based on logical addresses A8' to A15' because of the conditional branch.

Here, considered is a case where the access pattern 201 is extracted from the address sequence recorded in the first execution of the program, access pattern 202 is extracted from the address sequence recorded in the second execution of the program, access pattern 201 is extracted from the address sequence recorded in the third execution of the program, and the priority of each logical address (resume target logical address) based on an occurrence number in such access patterns is determined. In that case, the pattern where the resume target logical addresses A8 to A15 are accessed in the conditional branch becomes more, and the occurrence of the pattern where the resume target logical addresses A8' to A15' are accessed becomes low, and thus, a high priority is assigned to the resume target logical address A8 to A15 while a low priority is assigned to the resume target logical addresses A8' to A15'.

In that case, if trigger addresses A0 and A4 are accessed, the resume target logical addresses A8 to A15 are prefetched with a high priority and the resume target logical addresses A8' to A15' are prefetched with a low priority.

Here, if trigger address A8' is accessed, for example, the resume target logical addresses A16' to A19' are prefetched, and as a result of multiple executions of the program, the occurrence of the pattern where the resume target logical addresses A16' to A19' are accessed is low as a whole but the resume target logical addresses A16' to A19' are definitely accessed after the trigger address A8' is accessed. In such a case, if the trigger address A8' is accessed, the resume target logical addresses A16' to A19' may be prefetched with a high priority.

That is, in the present embodiment, the priority may be determined in consideration of the aforementioned conditional branch.

Third Embodiment

Now, a third embodiment will be explained. Note that, in the present embodiment, same detailed explanation as with the above-described first embodiment will be omitted, and elements different from the first embodiment will be explained.

FIG. 13 is a block diagram illustrating an example of the structure of the memory device 10 of the present embodiment. In FIG. 13, same elements as with those shown in FIG. 1 will be referred to by the same reference numbers, and the detailed description thereof will be omitted. In this example, elements different from FIG. 1 will be explained.

As in FIG. 13, the memory device 10 of the present embodiment includes a controller 13 which further includes an access resume data maintain unit 134, and in this respect, it is different from the above-described first embodiment.

The access resume data maintain unit 134 stores access resume data prepared by a placement unit 132. Note that, the access resume data maintain unit 134 is realized by a memory or the like of the memory device 10 other than a NAND flash memory 11 and a cache memory 12, for example.

In the present embodiment, an access resume unit 133 acquires access resume data which is referred to for storing (prefetching) resume target data in the cache memory 12, from the access resume data maintain unit 134.

Hereinafter, an outline of the operation of the memory device 10 of the present embodiment will be explained. FIG. 14 illustrates an example of access resume data prepared in a placement unit 132. In FIG. 14, a case where a plurality of access resume data including access resume data 132a to 132f are prepared by the placement unit 132 is considered. The access resume data 132a to 132f are access resume data prepared for each of trigger addresses A0, A4, A8, A12, A16, and A20 included in an address list output from an access history analysis unit 40 (that is, a plurality of access resume data corresponding to each of the trigger addresses). Note that, access resume data 132a to 132f shown in FIG. 14 are similar to access resume data 132a and 132b of FIG. 7, and thus, the detailed description thereof will be omitted here.

Here, in order to prefetch resume target data, monitoring of logical addresses transmitted to the memory device 10 from the CPU 20 is required by referring to the access resume data. If the aforementioned access resume data 132a to 132f of FIG. 14 are referred to by the access resume unit 133, the access resume unit 133 must execute, at each time when a logical address is transmitted to the memory device 10 from the CPU 20, a process to determine whether or not the logical address is a trigger address included in each of the access resume data 132a to 132f (hereinafter, referred to as address match determination process).

In this example, access resume data 132a to 132f are explained. However, in actuality, a greater number of access resume data must be referred to, and thus, a size of hardware (circuit) to rapidly execute the aforementioned address match determination process increases.

Therefore, in the present embodiment, the number of access resume data to be referred to for prefetching the resume target data is limited within the multiple access resume data prepared by the placement unit 132, and thereby, the aforementioned hardware size (hardware resource) is reduced.

Hereinafter, the operation of the memory device 10 of the present embodiment will be explained. Note that, the access record process is the same as with that of the first embodiment, and thus, the detailed description thereof will be omitted. Furthermore, the data placement process is basically the same as with that of the first embodiment except that an output of access resume data prepared by the placement unit 132 is the access resume data maintain unit 134 instead of access resume unit 133, and thus, the detailed description thereof will be omitted.

The access resume process of the present embodiment is basically the same as with that of the above-described first embodiment, except that the aforementioned access resume data is acquired from the access resume data maintain unit 134.

The access resume process will be explained with reference to a flowchart of FIG. 15. In this example, a plurality of access resume data such as aforementioned access resume data 132a to 132f of FIG. 14 are stored in the access resume data maintain unit 134.

First, the access resume unit 133 acquires access resume data of predetermined number from the access resume data maintain unit 134 (step S51).

Note that, a plurality of access resume data stored in the access resume data maintain unit 134 are prepared per trigger address included in the address list as mentioned above, and in step S51, access resume data of predetermined number are acquired in an occurrence order of the trigger address in the access pattern extracted from the aforementioned address sequence (that is, sequential order).

Specifically, if the trigger address occurs in the access pattern in an order of A0, A4, A8, A12, A16, and A20 while the number of access resume data acquired from the access resume data maintain unit 134 is four, the access resume unit 133 acquires access resume data 132a to 132d from the access resume data 132a to 132f of FIG. 14.

When the process of step S51 is executed, the access resume unit 133 sets the trigger addresses A0, A4, A8, and A12 included in each of the access resume data 132a to 132d acquired in step S51 as monitoring-target trigger addresses.

Then, the access resume unit 133 determines whether or not the logical address transmitted from the CPU 20 to the memory device 10 as the monitoring-target trigger address (step S52).

If the trigger address is determined to be not the monitoring-target trigger address (NO in step S52), the process waits for transmission of next logical address from the CPU 20, and the process of step S52 is repeated.

On the other hand, if the trigger address is determined to be the monitoring-target trigger address (YES in step S52), the access resume unit 133 instructs prefetching using the access resume data including the trigger address (step S53). Note that, the process of step S53 corresponds to step S23 of FIG. 8, and thus, the detailed explanation thereof is omitted here.

When the process of step S53 is executed, the access resume unit 133 updates a prefetch position (which will be described later), and acquires a next access resume data from the access resume data maintain unit 134 (step S54).

Next, the access resume unit 133 reconfigures (updates) a monitoring-target trigger address based on the access resume data acquired in step S54 (step S55).

Specifically, if access resume data 132a to 132d are acquired in step S51 as mentioned above, and prefetch is instructed using the access resume data 132a in step S53, then, in step S54, a prefetch position is updated to the trigger address A0 and the access resume data 132e is acquired from the access resume data maintain unit 134 as an access resume data including a next monitoring-target trigger address. In that case, in step S55, trigger addresses A4, A8, A12, and A16 included in each of the access resume data 132b to 132e are reconfigured as monitoring-target trigger addresses. Note that, the trigger address A0 included in the access resume data 132a using for the instruction of prefetch in step S53 is excluded from the monitoring-target trigger address.

Note that, in FIG. 15, the access resume process ends when the process of step S55 is executed for convenience of the explanation. However, the processes after step S52 will be repeated after the execution of the process of step S55.

Specifically, if prefetch is instructed using, for example, the access resume data 132b in repeated step S53 (that is, trigger address A4 is transmitted from the CPU 20), in step S54, the prefetch position is updated to the trigger address A4, and the access resume data 132f is further acquired from the access resume data maintain unit 134. In that case, in step S55, trigger addresses A8, A12, A16, and A20 included in each of the access resume data 132c to 132f will be reconfigured as monitoring-target trigger addresses. Note that the trigger address A4 included in the access resume data 132b used for instruction of prefetch in step S53 is excluded from the monitoring-target trigger address.

That is, in the present embodiment, referential access resume data are switched such that the number of monitoring-target trigger addresses is constantly less than a certain number (for example, four).

As mentioned above, in the present embodiment, a plurality of access resume data corresponding to each of a plurality of trigger addresses included in an address list are prepared, and the access resume data are stored in the access resume data maintain unit 134. In the present embodiment, in order to store (that is, prefetch) resume target data in the cache memory 12, access resume data of predetermined number are referred to from the access resume data stored in the access resume data maintain unit 134 (that is, trigger addresses included in the access resume data of predetermined number are monitored).

In the present embodiment, with such a structure, there is no need of monitoring all trigger addresses included in each of the access resume data prepared by the placement unit 132 (no need of referring to all of the access resume data), and thus, the hardware size to realize the prefetch of the present embodiment can be reduced. That is, in the present embodiment, improvement of the reading performance and reduction of the hardware size can be achieved both.

Note that, although a detailed description is omitted here, a structure related to priorities of the above-described second embodiment may further be applied to the structure of the present embodiment.

Fourth Embodiment

Now, a fourth embodiment will be explained. Note that, in the present embodiment, same detailed explanation as with the above-described first and third embodiments will be omitted, and elements different from the first and third embodiments will be explained.

FIG. 16 is a block diagram illustrating an example of the structure of the memory device 10 of the present embodiment. In FIG. 16, same elements as with those shown in FIGS. 1 and 13 will be referred to by the same reference numbers, and the detailed description thereof will be omitted. In this example, elements different from FIGS. 1 and 13 will be explained.

As in FIG. 16, the memory device 10 of the present embodiment include a controller 13, and an access resume unit 133 included in the controller 13 includes a detector 133c and a monitor unit 133d, which are elements different from the first and third embodiments.

The detector 133c detects a start of execution of a certain program based on a trigger address accessed by the CPU 20.

The monitor unit 133d refers to, in order to store (that is, prefetch) resume target data in the cache memory 12, access resume data prepared with respect to the program start of execution of which is detected by the detector 133c.

Hereinafter, the operation of the memory device 10 of the present embodiment will be explained. Note that, the access record process is similar to that of the first embodiment, and thus, the detailed explanation thereof is omitted here.

First, a data placement process in the present embodiment will be explained. In the above-described first and third embodiments, a case where an address list is prepared from a sequence of logical addresses accessed by the CPU 20 (access pattern) when one program (for example, program A) is executed is mainly explained. In the present embodiment, however, an access history analysis unit 40 prepares an address list for each of a plurality of programs executed in the memory system 30 (that is, address list is prepared per program). That is, FIG. 5 above shows an address list prepared with respect to program A. However, an address list is similarly prepared to each of the other programs such as program B and program C. A plurality of address lists prepared per program by the access history analysis unit 40 are transmitted to the placement unit 132.

The placement unit 132 prepares access resume data based on a plurality of address lists transmitted from the access history analysis unit 40. Note that, in the above-described first and third embodiments, multiple access resume data corresponding to each of multiple trigger addresses included in one address list is prepared from the address list. However, in the present embodiment, multiple access resume data are prepared for each of multiple address lists (per address list).

In the present embodiment, as mentioned above, multiple access resume data prepared per address list are stored in the access resume data maintain unit 134.

Now, an access resume process of the present embodiment will be explained. Here, many programs are executed in the memory system 30, and given that the number of programs is 1024, multiple access resume data prepared from each of the address lists of 1024 programs are stored in the access resume data maintain unit 134. In that case, if the access resume unit 133 refers to four access resume data per program executed in the memory system 30 (that is, monitors trigger addresses included in the four access resume data) as in the above-described third embodiment, the access resume unit 133 must execute, at each time when a logical address is transmitted from the CPU 20 to the memory device 10 (every time when the logical address is accessed by the CPU 20), the address match determination process (process to determine whether or not the logical address and the trigger address match) by 1024×4 times, and thus, the hardware size increases.

In contrast, in the present embodiment, the detector 133c of the access resume unit 133 refers to one access resume data per program from the multiple access resume data stored in the access resume data maintain unit 134. Note that, one access resume data referred to per program by the detector 133c is access resume data including a trigger address which appears the first in the access pattern of the program among the multiple access resume data prepared from the address list of the program. The number of access resume data referred to per program by the detector 133c may not be one, and may be a few.

Here, considered is a case where, among the access resume data referred to per program as above, a trigger address included in the access resume data prepared from an address list of a certain program (hereinafter referred to as target program) and a logical address transmitted from the CPU 20 to the memory device 10 match. In that case, the detector 133c detects a start of execution of the target program.

Next, the monitor unit 133d acquires multiple access resume data prepared from the address list of the target program start of execution of which is detected by the detector 133c (multiple access resume data corresponding to each of multiple trigger addresses included in the address list) from the access resume data maintain unit 134. Note that, the monitor unit 133d may acquire access resume data of a predetermined number (for example, four) from the multiple access resume data prepared from the address list of the target program as in the above-described third embodiment.

Hereinafter, the monitor unit 133d executes a process similar to the access resume process of the above-described third embodiment.

As above, in the present embodiment, an address list is acquired per program executed in the memory system 30, and multiple access resume data corresponding to each of multiple trigger addresses included in the address list (that is, access resume data per program) are prepared per address list. Furthermore, in the present embodiment, when the trigger address is accessed by the CPU 20, a start of execution of a target program (certain program) based on the trigger address is detected, and in order to store resume target data in the cache memory 12 (to prefetch), multiple access resume data corresponding to each of the multiple trigger addresses included in the address list of the target program start of execution of which is detected are referred to (that is, trigger address included in the multiple access resume data is monitored). In other words, in the present embodiment, based on a detection result of start of execution of a certain program, access resume data to be referred to for storing resume target data in the cache memory 12 are switched.

In this example, if an address list is prepared per program, a hardware size of which can execute the address match determination process for 1024×4 times is required. However, in the present embodiment, the detector 133c executes the address match determination process for 1024×1 times, and the monitor unit 133d executes the address match determination process for the same times as the number of access resume data acquired from the access resume data maintain unit 134 (for example, four) based on the target program, and therefore, the hardware size can be reduced. That is, in the present embodiment, the reading performance can be improved, and the hardware size can further be reduced as compared to the above-described third embodiment.

Note that, although a detailed description is omitted here, a structure related to priorities of the above-described second embodiment may further be applied to the structure of the present embodiment.

According to at least one of the above-described embodiments, a memory device which can improve the reading performance and a memory system of the same can be achieved.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory device comprising:
  a controller;
  a nonvolatile memory; and
  a cache memory, wherein
  the controller is configured to:
    record a plurality of first addresses sequentially accessed to read data stored in the nonvolatile memory,
    acquire an address list including a second address within the first addresses and a third address within the first addresses which is estimated to be accessed after the second address is accessed,
    read data from the nonvolatile memory based on the third address included in the address list if the second address included in the address list is accessed, and
    store, in the cache memory, the data read from the nonvolatile memory, and
  the second address and the third address are specified from the first addresses by analyzing the first addresses.

2. The memory device of claim 1, wherein
  the nonvolatile memory includes a plurality of pages where a page is a unit of data read operation, and
  the controller is configured to read, if two or more data within the data to be read based on the third address included in the address list are placed in one of the pages, the two or more data from the page in one read operation and stores the two or more data in the cache memory.

3. The memory device of claim 1, wherein, out of data to be read based on a second address and a third address included in the address list, data which is not stored in the cache memory when the second address is accessed is placed in advance in a memory area where data can be read faster than the nonvolatile memory.

4. A memory device comprising:
  a controller;
  a nonvolatile memory; and
  a cache memory, wherein the controller is configured to:
record a plurality of first addresses sequentially accessed to read data stored in the nonvolatile memory,
acquire an address list including a second address within the first addresses and a third address within the first addresses which is estimated to be accessed after the second address is accessed,
read data from the nonvolatile memory based on the third address included in the address list if the second address included in the address list is accessed, and
store, in the cache memory, the data read from the nonvolatile memory,
the nonvolatile memory includes a plurality of pages where a page is a unit of data read operation,
the address list includes a plurality of third addresses, and
the controller is configured to place, before the second address in the address list is accessed, data read based on each of the third addresses in a same page included in the nonvolatile memory.

5. The memory device of claim 4, wherein the controller is configured to:
generate, if the data read based on each of the third addresses is placed in the same page included in the nonvolatile memory, access resume data including the second address and a fourth address, the fourth address including a page number to identify the page, and
read, if the second address included in the access resume data is accessed, data from the nonvolatile memory based on a fourth address included in the access resume data.

6. The memory device of claim 5, wherein
the third addresses include a fifth address with high priority and a sixth address with low priority, and
the controller is configured to:
place data read based on the fifth address in a first page included in the nonvolatile memory, and generate first access resume data including the second address and the fourth address, the fourth address including a page number to identify the first page,
place data read based on the sixth address in a second page which is different from the first page included in the nonvolatile memory, and generate second access resume data including the second address and the fourth address, the fourth address including a page number to identify the second page, and
refer to the first access resume data with higher priority than the second access resume data in order to store the data in the cache memory.

7. The memory device of claim 6, wherein
the controller is configured to record the first addresses for a plurality of times, and
the fifth and sixth addresses are determined based on occurrence numbers thereof in the first addresses recorded for the plurality of times.

8. The memory device of claim 5, wherein
the controller is configured to:
acquire an address list including a plurality of second addresses and a plurality of third addresses estimated to be accessed after each of the second addresses is accessed,
generate a plurality of access resume data corresponding to each of the second addresses included in the address list, and
switch, if one second address of the second addresses is accessed, the access resume data to be referred to for storing the data in the cache memory with access resume data corresponding to another second address of the second addresses.

9. The memory device of claim 5 connected to a processor configured to execute a plurality of programs, wherein
the controller is configured to:
generate access resume data for each of the programs,
detect, if the second address is accessed, a start of execution of a specific program based on the second address, and
switch access resume data to be referred to for storing the data read from the nonvolatile memory in the cache memory based on a detection result.

10. A memory system comprising:
a memory device; and
a processor connected to the memory device, wherein
the memory device includes a controller, a nonvolatile memory, and a cache memory, and
the controller is configured to:
record a plurality of first addresses sequentially accessed to read data stored in the nonvolatile memory,
acquire an address list including a second address within the first addresses and a third address within the first addresses which is estimated to be accessed after the second address is accessed,
read data from the nonvolatile memory based on the third address included in the address list if the second address included in the address list is accessed, and
store, in the cache memory, the data read from the nonvolatile memory,
the processor is configured to generate the address list based on the first addresses recorded, and
the second address and the third address are specified from the first addresses by analyzing the first addresses.

11. The memory system of claim 10, wherein
the nonvolatile memory includes a plurality of pages where a page is a unit of data read operation, and
the controller is configured to read, if two or more data within the data to be read based on the third address included in the address list are placed in one of the pages, the two or more data from the page in one read operation and stores the two or more data in the cache memory.

12. The memory system of claim 10, wherein, out of data to be read based on a second address and a third address included in the address list, data which is not stored in the cache memory when the second address is accessed is placed in advance in a memory area where data can be read faster than the nonvolatile memory.

13. A memory system comprising:
a memory device; and
a processor connected to the memory device, wherein
the memory device includes a controller, a nonvolatile memory, and a cache memory, and
the controller is configured to:
record a plurality of first addresses sequentially accessed to read data stored in the nonvolatile memory,
acquire an address list including a second address within the first addresses and a third address within the first addresses which is estimated to be accessed after the second address is accessed,
read data from the nonvolatile memory based on the third address included in the address list if the second address included in the address list is accessed, and
store, in the cache memory, the data read from the nonvolatile memory, and the processor is configured to generate the address list based on the first addresses recorded, the nonvolatile memory includes a plurality of pages where a page is a unit of data read operation, the address list includes a plurality of third addresses, and the controller is configured to place, before the second address in the address list is accessed, data read based on each of the third addresses in a same page included in the nonvolatile memory.

14. The memory system of claim 13, wherein the controller is configured to:

generate, if the data read based on each of the third addresses is placed in the same page included in the nonvolatile memory, access resume data including the second address and a fourth address, the fourth address including a page number to identify the page, and read, if the second address included in the access resume data is accessed, data from the nonvolatile memory based on a fourth address included in the access resume data.

15. The memory system of claim 14, wherein the third addresses include a fifth address with high priority and a sixth address with low priority, and the controller is configured to:

place data read based on the fifth address in a first page included in the nonvolatile memory, and generate first access resume data including the second address and the fourth address, the fourth address including a page number to identify the first page, place data read based on the sixth address in a second page which is different from the first page included in the nonvolatile memory, and generate second access resume data including the second address and the fourth address, the fourth address including a page number to identify the second page, and refer to the first access resume data with higher priority than the second access resume data in order to store the data in the cache memory.

16. The memory system of claim 15, wherein the controller is configured to record the first addresses for a plurality of times, and the fifth and sixth addresses are determined based on occurrence numbers thereof in the first addresses recorded for the plurality of times.

17. The memory system of claim 14, wherein the controller is configured to:

acquire an address list including a plurality of second addresses and a plurality of third addresses estimated to be accessed after each of the second addresses is accessed, generate a plurality of access resume data corresponding to each of the second addresses included in the address list, and switch, if one second address of the second addresses is accessed, the access resume data to be referred to for storing the data in the cache memory with access resume data corresponding to another second address of the second addresses.

18. The memory system of claim 14, wherein the processor is configured to execute a plurality of programs, and the controller is configured to:

generate access resume data for each of the programs, detect, if the second address is accessed, a start of execution of a specific program based on the second address, and switch access resume data to be referred to for storing the data read from the nonvolatile memory in the cache memory based on a detection result.

* * * * *